(12) United States Patent
Duxbury et al.

(10) Patent No.: US 11,625,128 B2
(45) Date of Patent: Apr. 11, 2023

(54) OPTICAL TOUCH SENSOR SYSTEMS AND OPTICAL DETECTORS WITH NOISE MITIGATION

(71) Applicant: 1004335 ONTARIO INC., Ottawa (CA)

(72) Inventors: Guy Michael Amyon Farquharson Duxbury, Ottawa (CA); Robert Donald McCulloch, Ottawa (CA); Albert M. David, Manotick (CA)

(73) Assignee: 1004335 ONTARIO INC., Ottawa (CA)

(*) Notice: Subject to any disclaimer, the term of this patent is extended or adjusted under 35 U.S.C. 154(b) by 0 days.

(21) Appl. No.: 17/715,246

(22) Filed: Apr. 7, 2022

(65) Prior Publication Data

US 2022/0229512 A1    Jul. 21, 2022

Related U.S. Application Data

(63) Continuation of application No. 17/220,365, filed on Apr. 1, 2021.

(Continued)

(51) Int. Cl.
*G06F 3/042* (2006.01)
*G06F 3/041* (2006.01)

(52) U.S. Cl.
CPC .......... *G06F 3/0421* (2013.01); *G06F 3/0428* (2013.01); *G06F 3/04182* (2019.05)

(58) Field of Classification Search
CPC ............ G06F 3/04166; G06F 3/04182; G06F 3/0421; G06F 3/0428
See application file for complete search history.

(56) References Cited

U.S. PATENT DOCUMENTS

| 2,099,764 A | 11/1937 | Touceda |
| 2,379,496 A | 7/1945 | Saunier, Jr. |

(Continued)

FOREIGN PATENT DOCUMENTS

| CN | 106253859 A | 12/2016 |
| CN | 109787566 A | 5/2019 |

(Continued)

OTHER PUBLICATIONS

International Search Report and Written Opinion for PCT/CA2019/050666, dated Aug. 12, 2019 (17 pages).

(Continued)

*Primary Examiner* — Chun-Nan Lin
(74) *Attorney, Agent, or Firm* — Bookoff McAndrews, PLLC

(57) ABSTRACT

Optical touch sensors may be adversely affected by noise, such as modulated sunlight incident on the touch sensor. An analog optical detector is provided that includes a frequency dependent emitter feedback circuitry that does not substantially reduce the gain for a first modulation frequency range of the photodiode current and provides, for a second modulation frequency range of the photodiode current, a current feedback to reduce the gain of the first transistor. The second modulation frequency may include one or more expected noise modulation frequencies. A touch sensor device including a plurality of such optical detectors is also provided. Also provided is a touch sensor device comprising sampling disable circuitry operable to disable sampling of the output from the optical detectors for a duration of time.

14 Claims, 18 Drawing Sheets

Related U.S. Application Data

(60) Provisional application No. 63/004,779, filed on Apr. 3, 2020.

(56) References Cited

U.S. PATENT DOCUMENTS

| | | | |
|---|---|---|---|
| 2,900,521 | A | 8/1959 | Eames |
| 3,016,421 | A | 1/1962 | Harmon |
| 3,047,723 | A | 7/1962 | Knapp |
| 3,180,995 | A | 4/1965 | Briggs et al. |
| 3,624,401 | A | 11/1971 | Stoller |
| 3,723,738 | A | 3/1973 | Brenner et al. |
| 3,727,069 | A | 4/1973 | Crittendon, Jr. et al. |
| 3,742,222 | A | 6/1973 | Endl |
| 3,764,813 | A | 10/1973 | Clement et al. |
| 3,970,846 | A | 7/1976 | Schofield et al. |
| 4,040,738 | A | 8/1977 | Wagner |
| 4,113,353 | A * | 9/1978 | Matsushita ........ G06K 7/10831 359/636 |
| 4,243,879 | A | 1/1981 | Carroll et al. |
| 4,384,201 | A | 5/1983 | Carroll et al. |
| 4,622,564 | A * | 11/1986 | Kaku ..................... G11B 27/36 |
| 4,645,920 | A | 2/1987 | Carroll et al. |
| 4,672,364 | A | 6/1987 | Lucas |
| 4,684,801 | A | 8/1987 | Carroll et al. |
| 4,703,316 | A | 10/1987 | Sherbeck |
| 4,713,534 | A | 12/1987 | Masters et al. |
| 4,761,637 | A | 8/1988 | Lucas et al. |
| 4,799,044 | A | 1/1989 | Masters et al. |
| 4,847,606 | A | 7/1989 | Beiswenger |
| 4,855,590 | A | 8/1989 | Bures et al. |
| 4,943,806 | A | 7/1990 | Masters et al. |
| 5,266,792 | A * | 11/1993 | Crowne ..................... G01J 9/00 250/226 |
| 5,635,724 | A | 6/1997 | Higgins |
| 6,118,752 | A * | 9/2000 | Miyagawa ........ G11B 7/00745 |
| 6,201,270 | B1 | 3/2001 | Chen |
| 6,608,619 | B2 | 8/2003 | Omura et al. |
| 11,018,589 | B1 | 5/2021 | Huang |
| 2002/0145776 | A1* | 10/2002 | Chow ................. H04J 14/0241 398/31 |
| 2003/0210734 | A1 | 11/2003 | Kaku |
| 2007/0035706 | A1 | 2/2007 | Margulis |
| 2008/0042051 | A1* | 2/2008 | Sidor ................... G01D 5/3473 250/231.14 |
| 2010/0315383 | A1 | 12/2010 | Utukuri et al. |
| 2011/0074733 | A1 | 3/2011 | Makinen et al. |
| 2011/0198484 | A1 | 8/2011 | Kurokawa |
| 2011/0227874 | A1 | 9/2011 | Fahraeus et al. |
| 2011/0254466 | A1 | 10/2011 | Jackson et al. |
| 2011/0285370 | A1 | 11/2011 | Gritti |
| 2012/0182265 | A1 | 7/2012 | Smith et al. |
| 2012/0212458 | A1 | 8/2012 | Drumm |
| 2013/0120315 | A1 | 5/2013 | Utukuri et al. |
| 2013/0240707 | A1 | 9/2013 | Utukuri et al. |
| 2013/0259483 | A1* | 10/2013 | McLaren ................ H04J 14/02 398/79 |
| 2014/0019085 | A1 | 1/2014 | Utukuri et al. |
| 2014/0168169 | A1 | 6/2014 | Drumm |
| 2014/0226084 | A1 | 8/2014 | Utukuri et al. |
| 2015/0155951 | A1 | 6/2015 | Noda |
| 2016/0202839 | A1 | 7/2016 | Hwang |
| 2017/0179160 | A1 | 6/2017 | Takahashi |
| 2018/0113566 | A1 | 4/2018 | Shigemori |
| 2021/0311585 | A1* | 10/2021 | Duxbury ............... G06F 3/0421 |
| 2021/0311586 | A1* | 10/2021 | Duxbury ............. G06F 3/04182 |
| 2022/0229512 | A1* | 7/2022 | Duxbury ............... G06F 3/0428 |

FOREIGN PATENT DOCUMENTS

| | | |
|---|---|---|
| EP | 0364884 A2 | 4/1990 |
| JP | S59-79343 A | 5/1984 |
| JP | 3129077 B2 | 1/2001 |
| WO | WO 2019218074 A1 | 11/2019 |

OTHER PUBLICATIONS

International Search and Examination Report for GB2104778.2, dated Aug. 13, 2021, (6 pages).

Search and Examination Report in GB Application 2213550.3 dated Sep. 30, 2022 (5 pages).

* cited by examiner

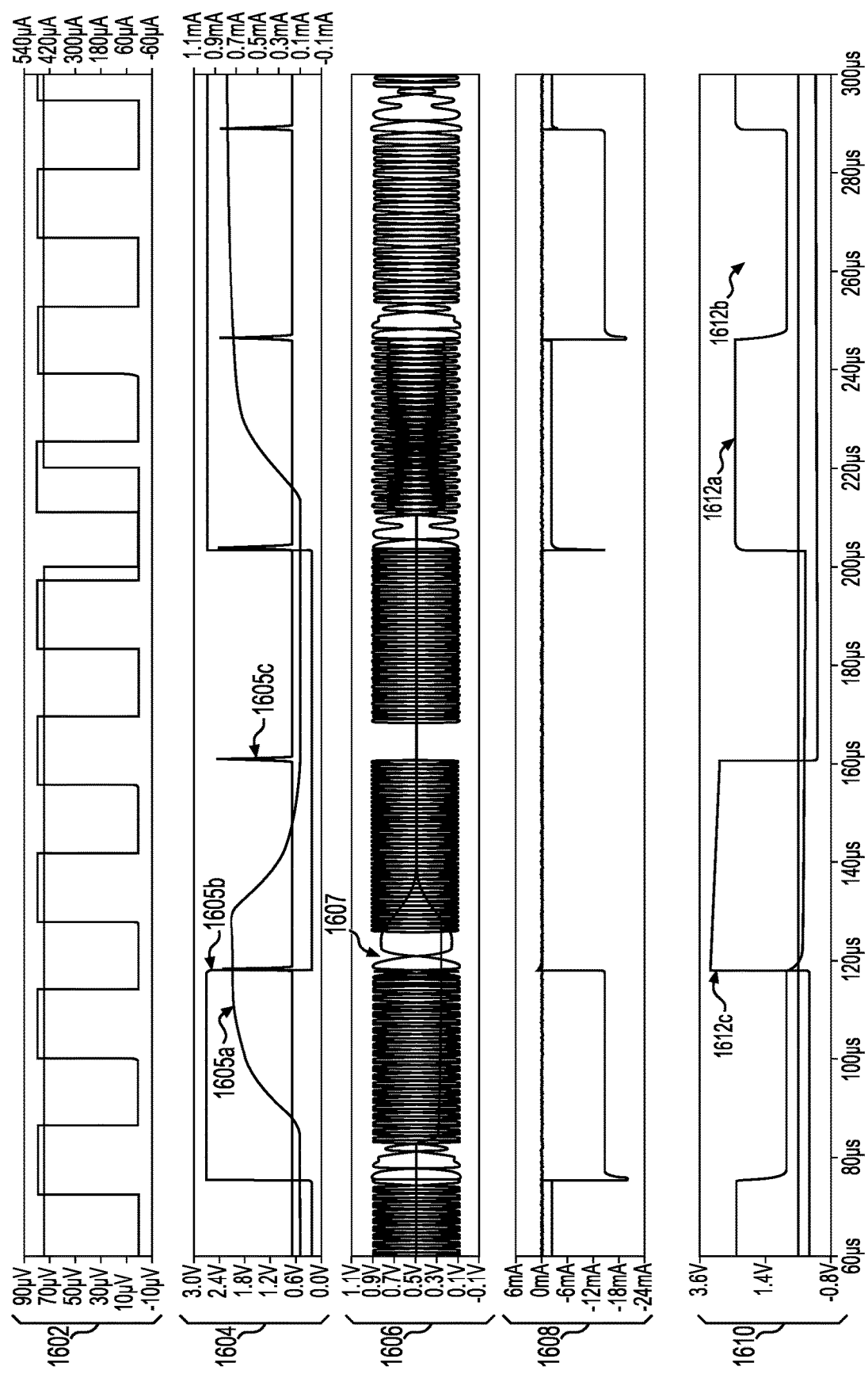

OPTICAL TOUCH SENSOR SYSTEMS AND OPTICAL DETECTORS WITH NOISE MITIGATION

RELATED APPLICATION

This application is a continuation of and claims priority to U.S. Non-provisional application Ser. No. 17/220,365, filed Apr. 1, 2021, which claims priority to U.S. Provisional Patent Application Ser. No. 63/004,779, filed Apr. 3, 2020, all of which are incorporated herein by reference in their entireties.

FIELD OF THE DISCLOSURE

This disclosure relates to touch sensor devices and controllers. More particularly, the disclosure relates to Optical IR touch sensors comprising arrays of light sources and optical detectors.

BACKGROUND

A number of different touch sensor technologies exist. These technologies include resistive, capacitive, surface acoustic wave, optical beam interference, and optical image-based touch sensor technologies. The present disclosure relates to, but is not limited to, optical beam interference-based touch sensors, which may be referred to as "optical touch sensors" herein. The term "Infrared (IR) touch sensor" as used herein refers to interference-based optical touch sensors operating in the IR range.

Infrared (IR) or other interference-based optical touch sensors typically have some advantages over other touch sensor technologies. Compared to capacitive based touch sensors, optical or IR touch sensors may have the following advantages: they may detect touches from a wide range of objects, not just ungloved fingers; they may not suffer from Radio Frequency (RF) interference; they may not be sensitive to thin conductive contaminants on the screen such as water; they may emit almost no radio frequency electromagnetic radiation; and they may not require electrically conductive layers over the screen which can degrade the screen's clarity and contrast.

IR touch sensors may typically comprise a sensing area with a periphery (e.g. screen) with IR light sources and detectors arranged about the periphery of the sensing area. IR touch sensors may operate by detecting multiple light paths travelling parallel and close to the surface of the sensing area and noting when previously clear paths are blocked by an opaque object. A single finger's location may typically be determined as where at least two light paths that are blocked or interfered with intersect. The term "light path" is to be understood as the path of light that travels between a light source (e.g. LED) and an optical receiver (and not necessarily the path of all light emitted from the light source).

IR touch sensors may be beneficial in environments where RF noise levels may be high, visible light reflections make the screen contrast low, the touch sensor is to be operated over a wide temperature range, users may want to be able to wear gloves, contaminants are present on the screen, and/or a long reliable life is required. Kiosks, cars and aviation are prime examples of such an environment.

IR touch sensors may consist of two orthogonal aligned arrays of beams, one array may be a set of "columns" for determining the "X" location of a finger, and the other array may be a set of "rows" for determining the "Y" location of the finger. An advantage of the orthogonal beams design is each light source may only need to be detected by a small number (typically between 1 and 20) optical receivers on the opposite side, so its light can be highly directional with the corresponding improved optical efficiency. Other IR touch sensors may have wide angle light from each light source fall on multiple detectors. However, wide angle optical beams may result in lower optical efficiency and lower signal to noise in each detector. Conventional wide-angle methods may thus require high power light sources, or expensive and unreliable mechanical steering mechanisms.

Combinations of different numbers of LED arrays and optical sensors have been described, for example, in U.S. Pat. Nos. 3,016,421 and 3,764,813, the entire contents of which are incorporated by reference.

A typical infrared touch sensor comprises a plurality of light sources (typical light sources are IR Light Emitting Diodes (LEDs), which may be referred to as "IREDs") and a corresponding plurality of optical detectors, where the light sources and detectors are arranged around all sides of an electronic display or other type of screen. Each light source may be arranged opposite to and aligned with a respective one of the detectors such that light from the light source travels generally parallel to the surface of the display and into the corresponding detector. For example, light sources may be arranged along two perpendicular sides of a rectangular display, and a corresponding number of detectors may be arranged on the other two sides and aligned with the light sources. Thus, when a person or object touches the display, they break the path of light between one or more light sources and detectors, and the position of the touch may be calculated based on the change in received light at the corresponding optical detectors.

Conventional IR touch screens may be susceptible to noise from bright environmental light sources such as ambient light sources and/or the sun. Some common sources of light interference include sunlight, bright incandescent lighting, and LED lighting. Sunlight levels incident on a touch sensor may be modulated (for example if the touch sensor is located in a moving vehicle or aircraft). Conventional touch sensor controllers may also cause some interference. If an optical detector saturates (e.g. in sunlight), then the output of the detector may become fixed, thereby suppressing any additional optical signal variations from the touch sensor LEDs. If the receiver is looking for a modulated signal, this may typically result in false touches being generated. If the receiver has a DC threshold detector then the light interference adds to the level of the received signal, and real touches may be suppressed.

One method to reduce such noise is to modulate the IR light source and have a receiving circuit that filters out the vast majority of signals other than the desired modulated signal. However, some noise may still cause issues with optical detectors. For example, sunlight may saturate optical detectors. Sunlight may also cause glitches or detection issues when the sun is only incident on a subset of the optical detectors.

SUMMARY

According to an aspect, there is provided an analog optical detector for a touch sensor comprising at least one light source, comprising: a photodiode; a first bipolar transistor coupled to the photodiode and configured as a current amplifier that generates an amplified current output as a function of a photodiode current; enable circuitry to enable and disable the optical detector as a function of an enable input signal wherein the enable circuitry comprises a second bipolar transistor, and a base of the second transistor is coupled to a collector of the first transistor; and frequency dependent emitter feedback circuitry that does not substantially reduce the gain for a first modulation frequency range of the photodiode current and provides, for a second modulation frequency range of the photodiode current, a current feedback to reduce the gain of the first transistor.

In some embodiments, the photodiode receives light from the at least one light source modulated at a frequency within the first modulation frequency range.

In some embodiments, second modulation frequency range comprises a noise modulation frequency range.

In some embodiments, the second modulation frequency range is lower than the first modulation frequency range.

In some embodiments, the frequency dependent emitter feedback circuitry is coupled to an emitter of the first transmitter.

In some embodiments, the frequency dependent emitter feedback circuitry is connected to the emitter of the first transistor, and the frequency dependent emitter feedback circuitry and the first transistor are together configured as a high pass filter.

In some embodiments, the frequency dependent emitter feedback circuitry comprises a capacitor and a resistor, parallel with the capacitor, coupled to the emitter of the first transistor.

In some embodiments, a substantially constant voltage source is connected through an impedance to a base of the first transistor.

According to an aspect, there is provided a touch sensor device comprising: a sensing area having a periphery; a plurality of light sources and a plurality of analog optical detectors arranged about the periphery of the sensing area, the plurality of light sources being aligned with the plurality of analog optical detectors; and addressing circuitry that selectively drives each of the plurality of light sources and selectively activates each of the plurality of analog optical detectors, wherein each of the plurality of analog optical detectors comprises a respective photodiode and a respective frequency dependent emitter feedback circuitry that does not substantially reduce the gain for a first modulation frequency range of the photodiode current and provides, for a second modulation frequency range of the photodiode current, a current feedback to reduce the gain of the first transistor.

In some embodiments, each analog optical detector comprises a respective first transistor coupled to the photodiode and configured as a current amplifier that generates an amplified current output as a function of the photodiode current, wherein the touch sensor device further comprises, for each analog optical detector, a respective substantially constant voltage source coupled to a base of the first transistor.

In some embodiments, the frequency dependent emitter feedback circuitry is coupled to an emitter of the first transmitter.

According to an aspect, there is provided a touch sensor device comprising: a sensing area having a periphery; a plurality of light sources and a plurality of analog optical detectors arranged about the periphery of the sensing area, the plurality of light sources being aligned with the plurality of analog optical detectors; addressing circuitry that selectively drives each of the plurality of light sources and selectively activates each of the plurality of analog optical detectors, wherein each light source, when driven, generates modulated light output having a modulation frequency; and sampling circuitry operable to perform sampling of output from the optical detectors; and sampling disable circuitry operable to disable sampling of the output from the optical detectors for a duration of time.

In some embodiments, the sampling of output from the optical detectors is modulation edge-based sampling.

In some embodiments, the disabling the sampling for the duration of time is triggered by a transition from one of the optical detectors being activated to another of the optical detectors being activated.

In some embodiments, the sample disable circuitry comprises a monostable module.

In some embodiments, the addressing circuit sequentially activates the analog optical detectors as a function of a clock signal, and the monostable module is triggered the clock signal.

In some embodiments, the monostable module generates a pulse output when triggered, the pulse output being input to edge sampling disable circuitry to disable the sampling for the duration of time.

In some embodiments, the duration of time is a function of a pulse width of the pulse output of the monostable module.

According to an aspect, there is provided a controller for a touch sensor device comprising a plurality of light sources and a plurality of analog optical detectors, comprising: addressing circuitry that selectively drives each of the plurality of light sources and selectively activates each of the plurality of analog optical detectors, wherein each light source, when driven, generates modulated light output having a modulation frequency; and sampling circuitry operable to perform modulation edge-based sampling of output from the optical detectors; and sample disable circuitry operable to disable sampling of the output from the optical detectors for a duration of time.

In some embodiments, the disabling the sampling for the duration of time is triggered by a transition from one of the optical detectors being activated to another of the optical detectors being activated.

In some embodiments, the sample disable circuitry comprises a monostable module.

Other aspects and features of the present disclosure will become apparent, to those ordinarily skilled in the art, upon review of the following description of the specific embodiments of the disclosure.

BRIEF DESCRIPTION OF THE DRAWINGS

The present disclosure will be better understood having regard to the drawings in which:

FIGS. 15 and 16 show additional simulation results.

DETAILED DESCRIPTION

Optical touch sensors rely on their optical receivers being able to detect sensor transmitted optical signals in the presence of a wide range of potentially interfering optical signals, which may have amplitudes several orders of magnitude larger and be modulated with a wide range of frequencies.

Some examples of potential optical noise that could prevent some optical touch sensors operating include rapid sun shadowing and reflections from propellers, fans and passing fence posts, and a wide range of artificial light sources from incandescent bulbs to switching power supplied LED lighting. The sun radiates high levels of optical energy including significant levels of infrared. Ideally, a detector should not come close to being saturated when exposed to the worst-case levels of sunlight associated with its use environment. When not moving the level may be relatively constant over a period of 100 ms or less and having DC blocking in the detector path can be effective in separating the desired signal from the solar signal. However, in transportation applications, moving past objects and strobing from propellers and fans can modulate the sun at rates of many kHz. In addition, modern lighting, especially modern fluorescent, low voltage and LED lighting typically use very low cost and electrically imperfect switching power supplies resulting in modulated light levels, including IR light, at rates up to 100 kHz or even more. Furthermore, conventional IR controllers as used on many devices such as televisions operate at frequencies around 38 kHz. Thus, noise may in some examples have modulation frequencies in the kHz range, or above.

A need remains for optical sensor devices with improved ability to mitigate negative effects of noise from sunlight and/or other sources.

Figure 1A:
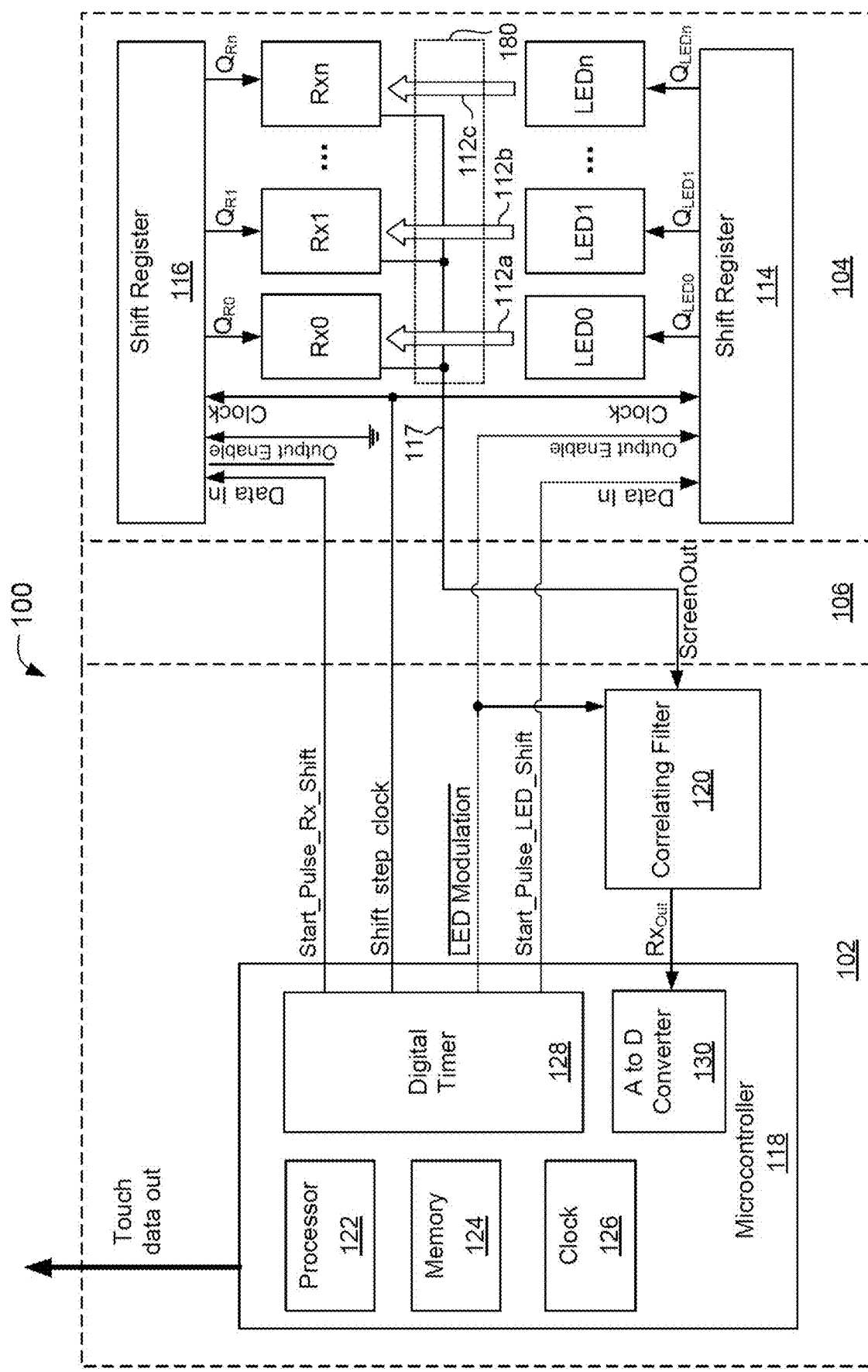
FIG. 1A is a block diagram of an example IR touch sensor system.

FIG. 1A is a block diagram of an example IR touch sensor system 100. The system 100 of FIG. 1A is described in detail in International Patent Cooperation Treaty (PCT) Patent Application No. PCT/CA2019/050666 (published as WO2019/218074), which is incorporated herein by reference in its entirety.

The touch sensor system 100 is divided into the following general functional components (indicated by dashed line boxes): a controller 102; a touch sensor 104 and an interconnect 106 coupling the controller 102 to the touch sensor 104. The touch sensor system 100 may be entirely housed in a touchscreen device (such as a tablet). Alternatively, the controller 102 and the touch sensor 104 may be housed in separate devices (e.g. control module and separate touchscreen), with the controller 102 several inches from the touch sensor 104. The interconnect 106 may comprise one or more wires, cables, flex connectors and/or any other suitable connection.

The touch sensor 104 in this example is in the form of a touchscreen that includes an electronic display 180 (e.g. display of a tablet or other electronic device) as its sensing area. Touch sensor embodiments described below may be implemented as a touchscreen including an electronic display. However, other touch sensor types may also be used (e.g. static image sensing area) and embodiments are not limited to electronic displays.

IR sensing circuitry of the touch sensor 104 shown and discussed below will typically be arranged around the periphery of the display 180. For example, the IR sensing circuitry may be contained in a bezel or other housing that extends around the periphery of the display.

The IR sensing circuitry of the touch sensor 104 includes a plurality of LEDs (LED0, LED1, . . . LEDn) that emit IR light and a plurality of IR detectors (Rx0, Rx1, . . . Rxn) for detecting IR light. The variable "n" is used to indicate that the exact number of LEDs and detectors in this embodiment is not specified and may vary. Each of the LEDs (LED0 to LEDn) is aligned with a respective one of the IR detectors Rx0 to Rxn such that light emitted by the LEDs (LED0 to LEDn) travels to the corresponding detector (Rx0 to Rxn) as indicated by arrows 112a to 112c. The LEDs may, for example, be spaced approximately 4 mm apart with a beam width of around 1.5 mm. Alternatively, the beam width may be a full 4 mm. Similarly, the receiving photodiode may receive around 1.5 to 4 mm beam width. Embodiments are not limited to these particular examples.

The LEDs are the light sources of the touch sensor system 100, but embodiments are not limited to LEDs and other light sources may be used. The term "light sources" is not limited to sources of visible light, and light sources may output non-visible light (e.g. IR light).

Figure 1B:
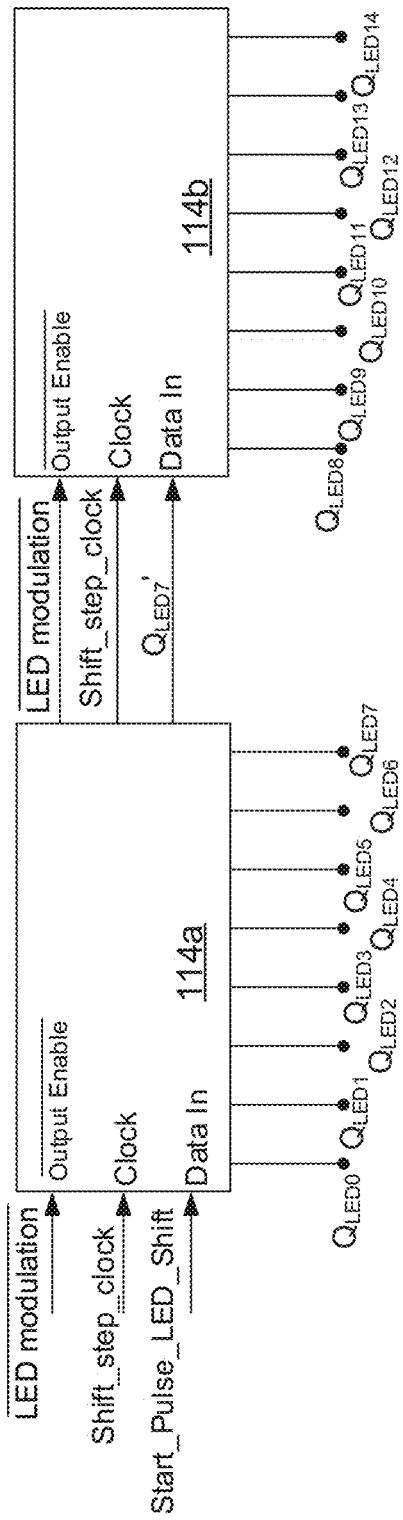
FIG. 1B is a block diagram of example first and second shift registers connected in series for activating LEDs in the touch sensor system of FIG. 1A.

If the display 180 is rectangular, the LEDs (LED0 to LEDn) may be arranged in a linear array around two perpendicular sides of the display 180, and the detectors (Rx0 to Rxn) may be arranged in a linear array along the remaining, opposing two sides (as shown in FIG. 1B). For example, if the display has four side edges defined as left, right, top and bottom, LEDs may be arranged along the top and left edges, while detectors are arranged and aligned with the LEDs along the bottom and right edges (or vice versa). Other arrangements may be used as well and embodiments are not limited to a particular positioning or arrangement of light sources and detectors. In other examples, LEDs and IR detectors may be interleaved (as in the example shown in FIGS. 5A to 5D).

The IR sensing circuitry of the touch sensor 104 further comprises a first shift register block 114 and a second shift register block 116. As will be explained below, the shift register blocks 114 and 116 are used herein as one possible embodiment of addressing circuitry for selectively and sequentially activating the LEDs (LED0 to LEDn) and the IR detectors (Rx0 to Rxn). However, other addressing methods may be used in other embodiments. Each of the plurality of LEDs (LED0 to LEDn) is connected to a respective one of the outputs ($Q_{LED0}$ to $Q_{LEDn}$) of the first shift register block 114. Each of the plurality of optical detectors (Rx0 to Rxn) is similarly connected to a respective one of the outputs ($Q_{R0}$ to $Q_{Rn}$) of the second shift register block 116.

The first and second shift-register blocks 114 and 116 each further include a respective clock input (shown as "Clock"), a data input (shown as "Data In") and an Inverse Output Enable input (shown as "Output Enable" with a bar above). The "Clock" inputs receive a common clock input (from the controller 102) for the first and second shift register blocks 114 and 116. The "Data In" inputs receive data bit inputs that are sequentially shifted through the first and second shift register blocks 114 and 116 at a rate set by the clock input. In FIG. 1A, data bits are shifted to the right. The "Output Enable" inputs of the shift register blocks 114 and 116, when driven, enable the respective set out outputs ($Q_{LED0}$ to $Q_{LEDn}$) and ($Q_{R0}$ to $Q_{Rn}$). For example, if the shift register block is an 8-bit shift register block (i.e. 8 storage positions and outputs) currently storing "00100000", driving the "Output Enable" input of the second shift register block 116 will cause the eight outputs $Q_{R1}$ to $Q_{R8}$ to output 0 0 1 0 0 0 0 0 respectively. Then, after the clock triggers a shift and assuming the Data In is low, the eight outputs $Q_{R1}$ to $Q_{R8}$ will output 0 0 0 1 0 0 0 0 respectively, and so on. Typically, the number of LEDs and detectors will be greater than eight, but the example above is given simply for illustrative purposes.

The first and second shift-register blocks 114 and 116 are used to sequentially activate the LED/detector pairs. When a high data bit ("1") is input synchronously to both the first and second shift register blocks 114 and 116, both the first and second shift register blocks 114 and 116 will behave identically. The data bit starts in a first shift register position corresponding to outputs $Q_{R0}$ and $Q_{LED0}$. While the data bit is in the first position, activating the corresponding "Output Enable" input on the first shift register block 114 triggers the first output $Q_{LED0}$, thereby driving LED0. Similarly, while the data bit is in the first position of the second shift register block 116, activating the corresponding "Output Enable" input triggers the first output $Q_{R0}$, thereby driving detector Rx0 at the same time as LED0 is driven.

When triggered by the clock input, the first and second shift-register blocks 114 and 116 shift the data bit to the next register position, thereby driving LED1 and Rx1 and so on. In this example, only one of the LED/detector pairs is selected at a given point in time. This is accomplished by keeping the "Data In" signal low (i.e. "0") during the time that the data bit (i.e. "1") travels through the first and second shift-register blocks 114 and 116.

The outputs of detectors (Rx0 to Rxn) are collectively connected to a single common analog databus 117 to generate a time-multiplexed output "ScreenOut" signal.

The controller 102 in this example includes a microcontroller 118 and a correlating filter 120 coupled to the microcontroller. The microcontroller 118 provides various control signals to the touch sensor 104, as will be described in more detail below. The correlating filter 120 receives and filters the collective detector output "ScreenOut" signal from the touch sensor detectors Rx0 to Rxn using a Zero Intermediate Frequency (Zero IF) correlation method as will be explained in more detail below. The correlation is based on the modulation pattern of the signal used to modulate the LEDs. The filtered output $Rx_{Out}$ is then passed to the microcontroller 118 for additional processing to generate touch data, which is output by the microcontroller 118 (e.g. for use by an apparatus or system including the touch sensor system 100). The microcontroller 118 outputs the processed touch data, which typically indicates the presence (or lack thereof) of a touch event on the display 180 of the touch sensor 104. Touch events typically refer to an object such as a finger touching the display 180. Basically, the approximate position of a finger or object touching the touch sensor 104 is approximated by monitoring changes in the light received at one or more detectors Rx0 to Rxn.

The microcontroller 118 comprises a processor 122; a memory 124 operatively coupled to the processor 122; an internal clock 126; a digital timer module 128; and an analog to digital converter (ADC) 130. In this example, the clock 126 generates a clock signal used by the processor 122 and the digital timer module 128. It is to be understood that the digital timer module 128 may be implemented by the processor 122 in some embodiments. Furthermore, the memory 124, the digital timer module 128 and the clock 126 are not necessarily external to the processor 122. A person skilled in the art will understand that the actual hardware and software implementation of the microcontroller 118 may vary while still providing the same or equivalent functionality described herein. Embodiments are not limited to a specific hardware or software implementation.

The digital timer module 128 provides the following output signals: "LED modulation chip rate"; "Shift Step Clock"; "Start_Pulse_LED_Shift", and "Start_Pulse_RX_Shift".

The embodiment below describes some example relationships between the timer module generated signals. It should be noted that the design can be made to function with a wide range of LED modulation chip rates, a wide range of modulation chips per shift step clock period, and the "start_pulses" can have a period longer than the number of LEDs around the bezel times the shift step clock period.

The "Start_Pulse_LED_Shift" signal periodically provides a data bit that is shifted through the shift register block 116 to sequentially activate the detectors Rx0 to Rxn. The "Start_Pulse_RX_Shift" signal periodically provides a data bit that is shifted through the first shift register block 114 to sequentially activate the LEDs (LED0 to LEDn). The "Shift Step Clock" signal is input to both shift register blocks 114 and 116 and, as a function of the frequency of the signal, controls shifting of the data bits through the shift register blocks 114 and 116 (shifting is to the right in FIG. 1A). The LED modulation signal is used to modulate the output of the LED (LED0 to LEDn) currently selected by the first shift register block 114. The LED is modulated at a rate higher than the rate of the "Shift Step Clock" signal (e.g. 24 LED chips per "Shift Step Clock" signal period). This modulation of the active LED is used for the correlation performed at the correlating filter 120 as discussed below. The LED modulation signal is also sent to the correlating filter 120 for that correlation process.

In some embodiments, the first shift register block 114 may comprise a single shift register or multiple shift registers connected in series (i.e. daisy-chained). Similarly, the second shift register block 116 may comprise a single shift register or multiple shift registers connected in series (i.e. daisy-chained).

The LEDs may each have lens that focusses the majority of its light into a beam. For example, the beam may be focused to a 3 dB width of around 10 degrees.

FIG. 1B shows an example set of first and second shift registers 114a and 114b for driving LEDs which are connected to form first shift register block 114 in FIG. 1A, where n=15 (i.e. 16 shift register outputs $Q_{LED0}$ to $Q_{LED15}$). As shown, the LED modulation and "Shift Step Clock" signals are input into the Inverse Output Enable and Clock inputs respectively of the first shift register 114a. The LED modulation and "Shift Step Clock" signals are also passed through to the same inputs of the second shift register 114b. Alternatively, rather than passing through the first and second shift registers 114a and 114b, the LED modulation and "Shift Step Clock" signals may be connected to each of the first and second shift register 114a and 114b in parallel.

The first shift register 114a has eight register positions corresponding to eight outputs $Q_{LED0}$ to $Q_{LED7}$, and second shift register 114b has another eight register positions corresponding to eight outputs $Q_{LED8}$ to $Q_{LED15}$. The data bit currently stored in the final register position of the first shift register 114a is output (labeled as output $Q_{LED7}'$) to the Data In input of the second shift register 114b. The output $Q_{LED7}$ corresponds generally to the output $Q_{LED7}'$, but is not dependent on the Output enable input of the shift register 114a.

The "Start_Pulse_LED_Shift" signal is input to the Data In input port of the first shift register 114a. A high-level data bit received from the "Start_Pulse_LED_Shift" signal will sequentially shift down the register positions corresponding to the eight outputs $Q_{LED0}$ to $Q_{LED7}$, at a rate set by the "Shift Step Clock" signal. When the data bit reaches the final register position corresponding to output $Q_{LED7}$ of the first shift register 114a, the high-level data bit is input to the second shift register 114b. Thus, starting on the next clock cycle, the high-level data bit will begin sequentially shifting through the eight register positions corresponding to the outputs $Q_{LED8}$ to $Q_{LED15}$ of the second shift register 114b.

The Outputs $Q_{LED0}$ will be actively driven high only when both the Inverse Output Enable is low and the data in the shift register associated with $Q_{LED0}$ is high. Outputs $Q_{LED1}$ to $Q_{LED15}$ are actively driven high similarly as the high data pulse is clocked through the shift registers.

More than two shift registers may be daisy chained together in other embodiments.

Figure 1C:
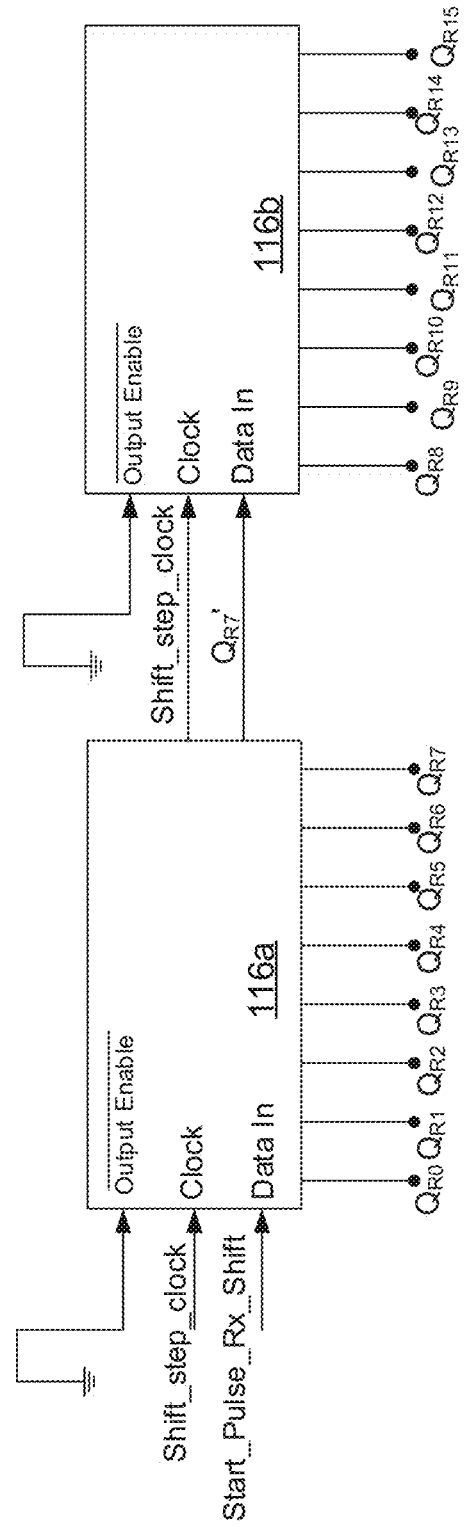
FIG. 1C is a block diagram of example first and second shift registers connected in series for activating optical detectors in the touch sensor system of FIG. 1A.

FIG. 1C shows an example set of first and second shift registers 116a and 116b for activating optical detectors, which are arranged to form the second shift register block 116 in FIG. 1A, where n=15 (i.e. 16 shift register outputs $Q_{R0}$ to $Q_{R15}$). As shown, the "Shift Step Clock" signal is input into the Clock input of the first shift register 116a. The "Shift Step Clock" signal is also passed through to the same input of the second shift register 116b.

The first shift register 116a has eight register positions corresponding to eight outputs $Q_{R0}$ to $Q_{R7}$, and second shift register 116b has another eight register positions corresponding to eight outputs $Q_{R8}$ to $Q_{R15}$. The data bit stored in the final register is output (labeled as output $Q_{R7}'$) to the Data In input of the second shift register 116b. Thus, the first and second shift registers 116a and 116b are daisy chained similar to the first and second shift registers 114a and 114b, but with the Inverse Output Enable inputs kept low. Thus, a high data bit input to the first shift register 116a will travel through the first shift register 116a and then through the second shift register 116b.

More than two shift registers may be daisy chained together in other embodiments.

In this example, at least one same shift register (or group of shift registers) is used to drive a plurality of LEDs using a common pre-synchronized enable signal may allow a large number of LEDs to be addressed using a single selection signal (e.g. "Start_Pulse_LED_Shift" signal in FIGS. 1A to 1C) and modulated by a single signal (e.g. LED modulation signal in FIGS. 1A to 1C) from the controller. The optical detectors are similarly enabled using a single selection signal (e.g. "Start_Pulse_Rx_Shift" signal in FIGS. 1A to 1C) from the controller that is synchronized with the LEDs. The same clock signal (e.g. "Shift Step Clock" in FIGS. 1A to 1C) from the controller is input to the shift registers. Thus, a variable number of LEDs and optical detectors may be selectively enabled using the same four signals. Similarly, a single output analog databus (labeled "ScreenOut") is used to carry the time-multiplexed output of all of the optical detectors. This may allow for a relatively compact interconnect 106 between the touch sensor 104 and the controller 102 having a size and number of wires that is independent of sensor area size.

One skilled in the art will appreciate that there are multiple alternative embodiment variations that deliver a similar LED drive and receiver activation capability using different combinations of high or low "Start_Pulses", using "AND" or "OR" gates or Output Enable circuits or Inverse Output Enable circuits on the outputs of the shift registers, and/or changing the LEDs and receivers from active high to active low devices.

Figure 1D:
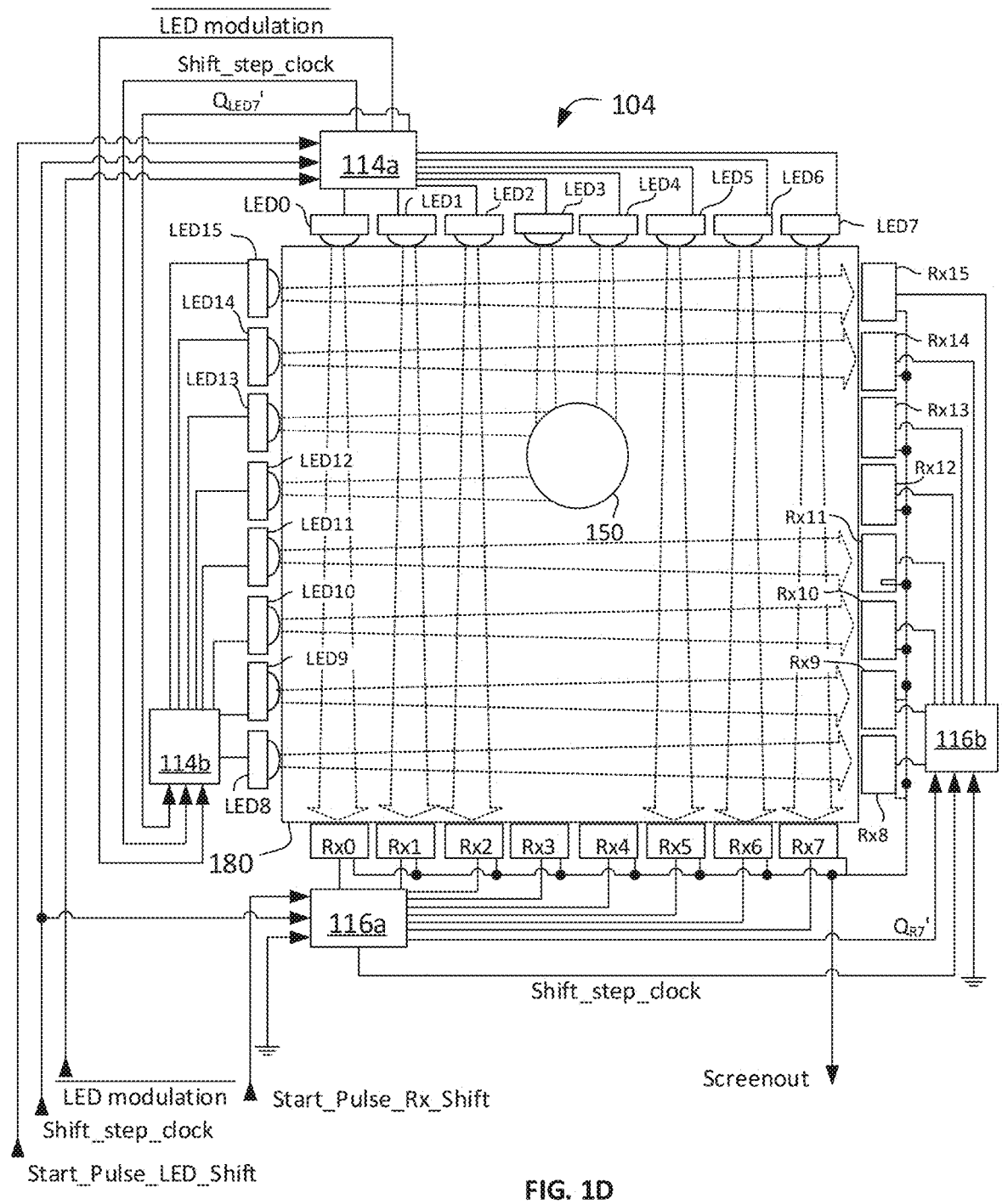
FIG. 1D is a schematic diagram of an example touch sensor of the system of FIG. 1A.
Figure 10:
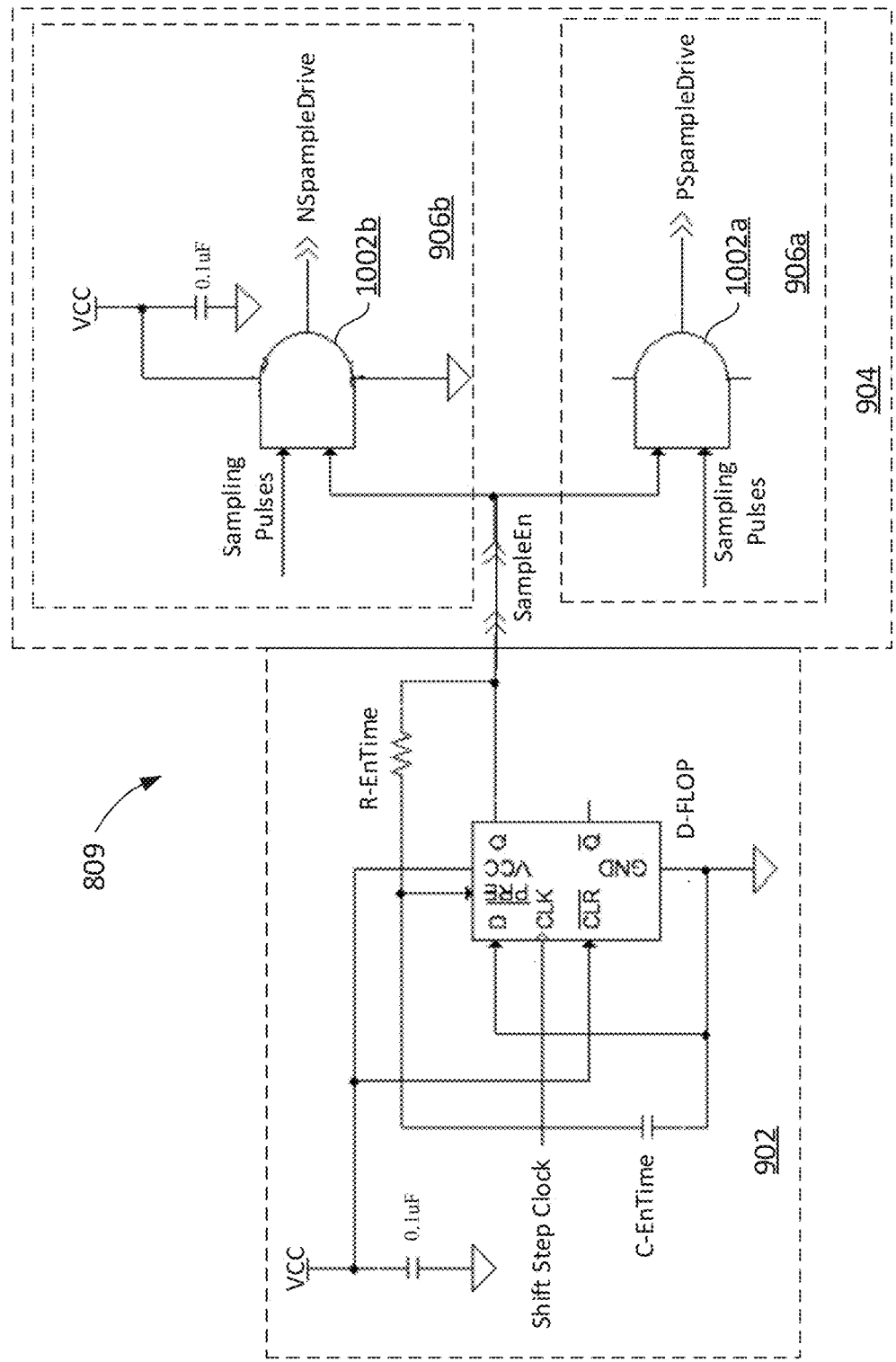
FIG. 10 is a schematic diagram showing a potential circuitry implementation of example enable/disable circuitry of FIGS. 8 and 9.

FIG. 1D is a schematic diagram of one example of the touch sensor 104 from FIG. 1A, using the first and second shift registers 114a and 114b in FIG. 1B and the first and second shift registers 116a and 116b in FIG. 10.

In FIG. 1D, the touch sensor 104 comprises an electronic display 180, the shift registers 114a and 114b, the shift registers 116a and 116b, 16 LEDs (LED0 to LED15) and 16 optical detectors (Rx0 to Rx15). A first set of eight LEDs (LED0 to LED7) are arranged along a top edge of the display 180, with a corresponding first set of eight optical detectors (Rx0 to Rx7) arranged along the bottom of the display 180, such that each detector (Rx0 to Rx7) is aligned with a respective one of the LEDs (LED0 to LED7). The outputs $Q_{LED0}$ to $Q_{LED7}$ of the first shift register 114a are each connected to a respective one of the first set of LEDs (LED0 to LED7). The outputs $Q_{R0}$ to $Q_{R7}$ of the first shift register 116a are each connected to a respective one of the first set of optical detectors (Rx0 to Rx7). Thus, vertical light paths are created between the first set of LEDs (LED0 to LED7) and the first set of optical detectors (Rx0 to Rx7) as illustrated by downward facing arrows in FIG. 1D.

The second set of eight LEDs (LED8 to LED15) are arranged along the left edge of the display 180 and connected to corresponding outputs $Q_{LED8}$ to $Q_{LED15}$ of the second shift register 114b. The second set of eight detectors (Rx8 to Rx15) are arranged along the right edge of the display 180 and connected to the corresponding outputs of $Q_{R8}$ to $Q_{R15}$ of the second shift register 116b. The second set of eight LEDs (LED8 to LED15) and the second set of eight detectors (Rx8 to Rx15) are aligned to form horizontal (left to right in this example) light paths as indicated by right facing arrows in FIG. 1D.

FIG. 1D also shows a circle 150 representative of an object (e.g. finger) touching the display 180. This touch event blocks light from LED3, LED4, LED12 and LED13. Thus, the X and Y position of the touch event may be approximated by detecting the change in light received at Rx3, Rx4, Rx12 and Rx13.

Figure 2:
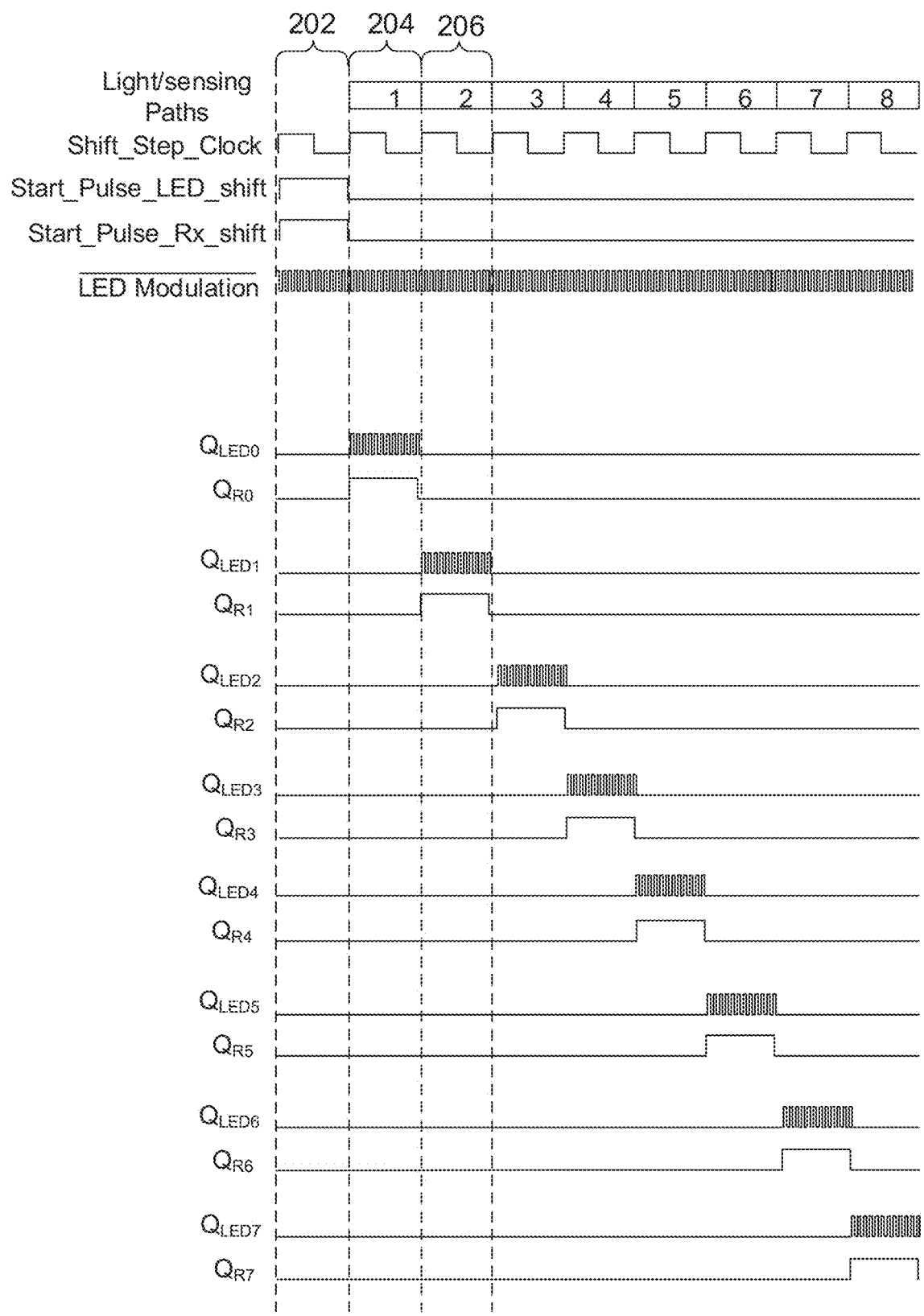
FIG. 2 is a signal diagram showing example input and output signals within the system of FIG. 1A.

FIG. 2 illustrates the states of output signals "Start_Pulse_LED_Shift", "Shift Step Clock"; "LED modulation"; and "Start_Pulse_RX_Shift" over an 8-step cycle. The resulting states of the outputs $Q_{LED0}$ to $Q_{LED7}$ of the first shift register 114a and the outputs $Q_{R0}$ to $Q_{R7}$ of the first shift register 116a from FIG. 1C are shown. A similar output pattern will subsequently follow through the second shift register 114b and the second shift register 116b.

As shown, the "Start_Pulse_LED_Shift" and "Start_Pulse_RX_Shift" signals are high for the first clock cycle 202 (i.e. step or shift period) set by the "Shift Step Clock" signal, in order to start a data bit "1" moving through each of the shift registers 114a and 116a. In the next clock cycle, the "Start_Pulse_LED_Shift" and "Start_Pulse_RX_Shift" signals are driven low and stay low for the remainder of the sequence shown. Thus, through the sequence shown, a single "1" bit travels through each of the shift registers 114a and 116a.

In the next clock cycle 204 shown, the "1" bit is shifted to the first outputs $Q_{LED0}$ and $Q_{R0}$ of the shift registers 114a and 116a. The output $Q_{R0}$ that drives the first detector (Rx0 in FIG. 1D) stays high for the entire clock cycle, because the Inverse Output Enable input of the shift register block 116 is grounded (see FIG. 1C). However, the LED modulation signal input to the first shift register block 114 modulates the output $Q_{LED0}$ that drives the first LED (LED0 in FIG. 1D). Thus, the output of the first LED (LED0) is modulated at the frequency of the LED modulation signal.

In the next clock cycle 206 shown, the "1" bit is shifted to the second outputs $Q_{LED1}$ and $Q_{R1}$ of the shift registers 114a and 116a. The output $Q_{R1}$ that drives the second detector (Rx1 in FIG. 1D) stays high for the entire clock cycle. The output $Q_{LED1}$ drives the modulated output of the second LED (LED1 in FIG. 1D) at the frequency of the LED modulation signal.

The process continues, and for each subsequent clock cycle (i.e. step period), the active detector/LED pair shifts by one due to the shifting outputs of the shift registers 114a and 116a. This process eventually results in each LED/detector pair being active for a period, which may collectively be referred to as a single "scan" of the touch sensor. The scan process may then be repeated periodically to scan for the presence of one or more fingers or other objects partially or fully blocking transmission between one or more detector/LED pairs.

As described above, each LED is modulated to provide several chips over the active period of the corresponding optical detector. For example, each LED may be chipped 24 times, 32 times, 64 times or more. The chip rate of the LED modulation may, for example, be in the range of 100 k chips per second to 30 M chips per second or more. The chip rate of the LED modulation may be limited by the optical detector speed and/or the correlator minimum sampling period. Conventional detectors that may be fast enough for such chip rates may be large and/or expensive such that they are not ideal for use in consumer portable devices in which small form factors (including small bezel spaces) and reasonable price points are important factors.

The following discussion of FIGS. 3 to 6 and 8 to 14 includes specified values and characteristics of circuitry components including various resistances, capacitances, component types and configurations etc. These specified values and characteristics are provided to illustrate concepts of the disclosure. However, embodiments of the disclosure are not limited to the specific example circuitry shown in the drawings and different circuitry configurations and variations may also perform the functions described herein. Circuit components such as resistors and capacitors shown in the drawings need not be discrete resistors or capacitors in some embodiments. Any circuitry that provides resistances and/or capacitances may be used.

Figure 3:
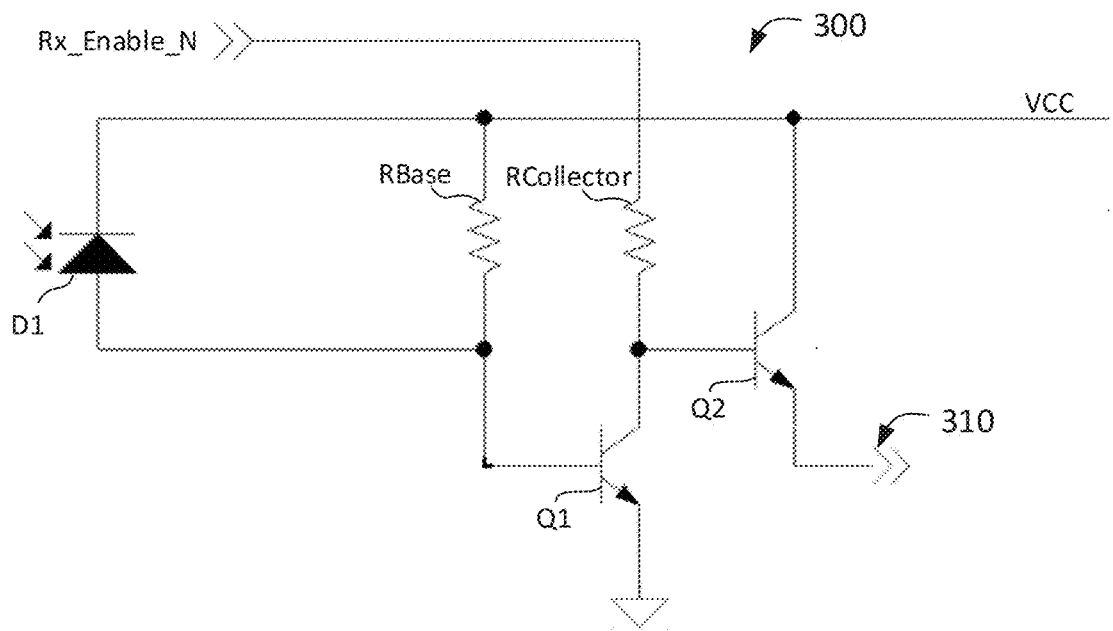
FIG. 3 is a schematic diagram of an example optical detector.

FIG. 3 is a schematic diagram of an example fast optical detector 300 that may be used in an optical IR touch sensor system (such as system 100) according to some embodiments. In FIG. 3 the "RX_Enable_N" signal is the signal drive used to enable or activate the optical detector 300 (being the "N'th" receiver in this example). For example, the "RX_Enable_N" signal would be the corresponding shift register output for the touch sensor system 100 in FIG. 1A.

The analog optical detector 300 includes a photodiode D1 and first and second transistors Q1 and Q2. The first and second transistors Q1 and Q2 are NPN transistors in this example and may be in the form of a 6-pin dual transistor package. However, embodiments are not limited to a particular type of transistor or the particular arrangement of the optical detector 300. The photodiode D1 is connected between the base of Q1 and a voltage rail VCC (4V in this example). The term "voltage rail" is used to denote the voltage provided to the optical detector 300 from a voltage source, but embodiments are not limited specifically to a voltage rail.

The first transistor Q1 in this example is a bipolar transistor having a base, an emitter, and a collector. The first transistor Q1 is coupled to the photodiode D1 in a current amplifier configuration that generates an amplified current output as a function of a photodiode current. A collector current of the transistor substantially mirrors and amplifies the photodiode current to generate the amplified current output. The second transistor Q2 is also a bipolar transistor and functions as enable circuitry to enable and disable the optical detector 300, as explained below. However, embodiments are not limited to bipolar transistors as enable circuitry, and enable circuitry may be modified or omitted in other embodiments.

The collector of the first transistor Q1 is connected in parallel to a first resistor RCollector and the base of Q2. The first resistor RCollector may control sensitivity of the optical detector 300. The first resistor RCollector is also connected to receive the "Rx_Enable_N" signal input, which is in turn connected to the corresponding output of the shift register (e.g. one of $Q_{R0}$ to $Q_{Rn}$ in FIG. 1A). The base of the first transistor Q1 is connected to a second resistor RBase (in parallel with the photodiode d1), which is in turn connected to the voltage rail VCC.

The base of the second transistor Q2 is grounded. The collector of the second transistor Q2 is connected to voltage rail VCC and the emitter of the second transistor Q2 is connected to the output "OUT" of the optical detector 300. The collector of the second transistor Q2 may, in some embodiments, be powered at least 0.3V above the high voltage of the emitter connected to common output bus.

The voltage across the photodiode may be 3.5 volts. The photodiode D1 may be a 4.0 mm spaced IR photodiode with a lens. The "Rx_Enable_N" signal input may periodically be driven high with a 3.3 volt pulse to enable the optical detector 300. The VBE (base-to-emitter voltage) Q1 may be 0.5 volts. The resistor RCollector may be a 0402 type resistor. Q1 and Q2 may be in the form of a 6-pin dual transistor package. These specifications are provided by way of example, and embodiments are not limited to these particular specifications.

The outputs of other optical detectors (not shown in FIG. 3) may be connected in parallel via output connections 310 to a common output analog databus labeled "ScreenOut" (see, for example, the common output connection of the detectors Rx0 to Rxn shown in FIG. 1A, which produce the collective output signal). Another resistor may be connected between output connection 310 and ground. That resistor may be connected between outputs of each of a plurality of optical detectors (including the detector 300) and ground.

The first transistor Q1 acts as a current-to-current amplifier with its collector current being the photo-diode current multiplied by the transistor's Hfe current gain factor. The voltage across the photo-diode D1 may not vary significantly as the photo-diode's current varies. A minimal resistance may be in series with the emitter of the first transistor Q1. The collector of the first transistor Q1 is biased by resistor RCollector that is driven by the "Rx_Enable_N" signal input.

The photodiode D1 is essentially constantly reverse biased and feeds its photo-induced current into the base of the first transistor Q1. The almost constant bias may result in very little of the small optically induced current changes being wasted in charging and discharging the photodiode D1 and/or transistor parasitic capacitances.

When the "Rx_Enable_N" signal input is high, the first transistor Q1 may amplify any current from the photodiode D1 resulting in a light dependent voltage across the resistor RCollector which the second transistor Q2 buffers onto a common analog databus 117. When the "Rx_Enable_N" signal input is low, the collector of the first transistor Q1 may be low preventing it from acting as an amplifier. In this case, the photodiode current simply passes through the base emitter junction of the first transistor Q1. The base of the second transistor Q2 may also be low preventing any current flow through it.

Q2 enables and disables the current amplifier of Q1 as a function of an enable input signal (the "Rx_Enable_N" signal in FIG. 3). When the "Rx_Enable_N" signal input is low, no current flows into Q1's collector as Q2 base to collector and base to emitter junctions are both reverse biased. Q2's emitter therefore also injects no current onto the ScreenOut bus.

When the "Rx_Enable_N" signal input is high the voltage seen at Q2's base will be approximately equal to the "Rx_Enable_N" signal input voltage minus the drop across RCollector due to the current flowing through Q1's collector which is proportional to the photo-diode current.

The emitter of Q2 drives the "ScreenOut" signal output at around 0.5V less than Q2's base voltage.

When the reverse biased photodiode D1 is exposed to IR light from the LEDs, current proportional to that light is released through the photodiode D1. This current is amplified by Q1 and if the collector of Q1 is biased high via the resistor RCollector, a voltage proportional to the current will be seen across the resistor RCollector. If the resistor RCollector is not biased high the voltage on Q1's collector will stay low (e.g. less than 0.6V).

The resistor RCollector is selected so that when the photodiode is exposed to the maximum level of IR light Q1 will still have sufficient voltage across it to act as an amplifier. Preferably, the resistor RCollector is optimized to ensure significant voltage swings due to the light from the screen's LEDs while ensuring the voltage across the resistor RCollector under the maximum possible levels of light is less than 3V.

Alternatively, the resistor RCollector may be located in the controller or duplicated in both the bezel and the controller. R5 may be added to reduce a higher-level pulse drive down to levels where the Q2 remains biased when activated.

Rather than the specific transistors shown in Figure, various combinations of NPN transistors, PNP transistors, Diodes, JFETS, NMOS and/or PMOS gates may be to perform similar functions. Embodiments are not limited to the specific components or arrangements shown in FIG. 3.

The optical detector 300 of FIG. 3 may provide the same or similar receiver gain for the light source modulation signal frequency (e.g. "LED MODULATION" frequency in FIG. 1A) and sun exposure frequency (e.g. the frequency of the Shift Step Clock in FIG. 1A, which causes alternating optical paths). Exposing the photodiode D1 to strong sunlight may cause the collector of the first transistor Q1 to draw more current than the circuitry that driving the receiver enable signal (RX_Enable_N in FIG. 3) can deliver.

Strong sunlight may, thus, result in loss of the desired signal. For example, in some implementations, the RxEnable_N signal may be driven from circuitry (e.g. shift registers) capable of delivering a maximum of approximately 20 mA. If strong interference, such as strong sun on the photo-diode, is amplified by the first transistor Q1, then the first transistor may try to draw more current through its collector than the enable signal driving device can supply. This may potentially result in the voltage at the collector of Q1 rapidly dropping below what Q1 needs to properly amplify small signals. Even if within the current capacity of the enable signal, the associated output voltage swings between optical detectors exposed to the strong sunlight and those not exposed to the strong sunlight may be very large relative to the desired signal.

As one option, the enable signal of the optical detector may be driven with circuitry capable of higher current output (e.g. much more than 20 mA). However, increasing the current maximum may result in an increase in the size of the driving circuitry. For example, shift registers capable of increased current output may be larger, which may in turn require a larger bezel for the touch sensor apparatus and/or increase cost.

According to some embodiments, the optical detector may include frequency dependent emitter feedback circuitry. The emitter feedback circuitry may be connected between the emitter of the first transistor and ground. The emitter feedback circuitry may cause the gain for the lower sun exposure frequency to be lower than for the of the higher light source modulation signal (e.g. LED modulation) frequency. This may help prevent loss of the desired signal.

Figure 4:
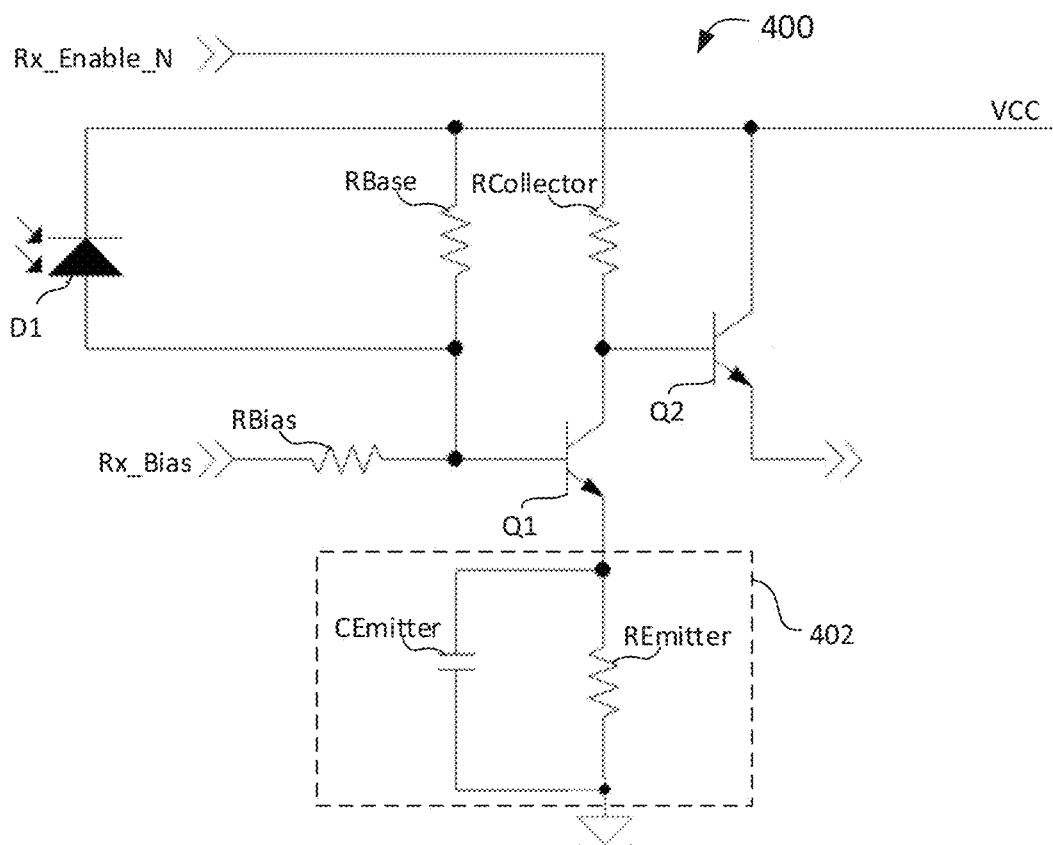
FIG. 4 is a schematic diagram of an example optical detector having a frequency dependent emitter feedback circuitry according to some embodiments.

FIG. 4 is a schematic diagram of an example optical detector 400 according to some embodiments of the present disclosure. The optical detector 400 is similar to the optical detector 300 in FIG. 3 (wherein like reference characters denote like elements), but it is modified to further include frequency dependent emitter feedback circuitry 402. The optical detector 400 includes first and second transistors Q1 and Q2, first and second resistors RCollector and RBase and a photodiode D1 arranged similarly to the optical detector 300 of FIG. 3. The frequency dependent emitter feedback circuitry 402 is connected between the emitter of the first transistor Q1 and ground in this embodiment.

For a first modulation frequency range of the photodiode current, the frequency dependent emitter feedback circuitry 402 does not substantially reduce the gain provided by the first transistor Q1. The LED modulation frequency is within this first range, such that the modulation due to the light source output modulation (i.e. the desired signal) is not substantially affected by the frequency dependent emitter feedback circuitry 402. However, the frequency dependent emitter feedback circuitry 402 provides, for a second modulation frequency range of the photodiode current output, a current feedback to reduce the gain of the first transistor Q1. The second modulation frequency range (for which current gain is reduced) may include one or more expected noise modulation frequencies. These noise modulation frequency or frequencies may, for example, correspond to expected sunlight modulation.

The first modulation frequency range includes the LED modulation frequency in this example and may include frequency content from half the chip rate and upwards. The second frequency range (i.e. containing noise modulation) may include frequency content less than a quarter of the operating chip rate, for example. Thus, the LED modulation frequency content of the photodiode current output may be amplified by the first transistor Q1, while frequency content of noise (e.g. modulated sunlight) may be filtered. The frequency dependent emitter feedback circuitry 402 when connected to the emitter of the first transistor Q1 modifies the Q1 gain stage to be a high pass filter.

The term "substantially" is used herein to denote that gain need not remain absolutely constant or unchanged at the second frequency. For example, gain reductions up to 3 dB at half the LED modulation chip rate caused by the dependent emitter feedback circuitry 402 may be considered not substantially reduced. Gain variations from approximately ¼ of the chip to approximately ½ of the chip rate may be less than 1.5 dB. In this case, the 3 dB corner of the frequency dependent emitter feedback circuitry 402 may be less than ⅓ of the chip rate. If the 3 dB corner of the frequency dependent emitter feedback circuitry 402 is close to the chip rate, the circuit attenuates the gain by a further 3 dB for every factor of two lower frequency. For example, for an LED modulation chip rate of 1.5M chips per second, the 3 dB corner of the frequency dependent emitter feedback circuitry 402 may be set at 200 kHz. Modulated sunlight or LED/incandescent lighting noise may be modulated at frequencies far below 200 kHz, and as such, such noise may be attenuated significantly more than 3 dB.

The first frequency, for which gain is reduced, may correspond to a noise source, such as an expected frequency range for modulated sunlight. The second frequency, for which gain is not reduced, corresponds to the modulation of light sources of the touch sensor (i.e. the desired signal). Thus, the second frequency will correspond to the LED modulation frequency in the example touch sensor of FIG. 1A. The LED modulation may be higher (likely much higher) than expected modulation of sunlight, for example.

The first and second transistors Q1 and Q2 are again NPN transistors in this example and may be in the form of a 6-pin dual transistor package. Q1 and Q2 may be small, fast NPN transistors, such as BFS483 transistors, for example. However, embodiments are not limited to a specific transistor type. The photodiode D1 may be any suitable photodiode. One example photodiode is a VEMD10940FX01 Silicon PIN Photodiode, although embodiments are not limited to this specific photodiode.

The optical detector 400 may be connected to a "constant" voltage source that provides a reference voltage "Rx_Bias" input to the base of the first transistor Q1. A bias resistor RBias is connected in series between the base of the first transistor Q1 and the reference voltage "Rx_Bias" input. The term "constant" as used herein does not mean absolutely constant, and some fluctuation in the actual bias voltage is permissible and/or expected, and the voltage is still considered substantially constant. The first stage current to voltage gain Hfe provided by the first transistor Q1 may be relatively high (e.g. between 100 and 150) to enable sufficient detection of the optical signals sent from the light sources (e.g. LEDs) across the screen. The current to voltage gain Hfe may be equal to the current gain of the first transistor Q1 multiplied by its collector resistor (Rcollector) value.

The gain (Hfe) of available fast small signal transistors may be between 100 and 150, for example. To prevent saturation, a frequency dependent emitter feedback circuitry (such as circuitry 402 in FIG. 4) may be used to lower the effective first stage gain without significantly reducing the gain to the desired signal or cause significant voltage variations across the photodiode D1.

The first transistor Q1 may need sufficient voltage (e.g. at least 1.3V) from its collector to emitter to operate in the desired range. This may, in turn limit the maximum voltage drop allowed across the first resistor RCollector (e.g. to around 2.0V). The resistor RCollector may define current-to-voltage gain. With a maximum drive current of 20 mA, by way of example, the maximum value for the collector resistor may be 100 ohms.

When photodiode D1 is exposed to full intensity sunlight directly its photodiode lens, approximately 215 uA of current may flow through the photodiode D1. To keep the collector current significantly below the maximum 20 mA the effective current gain of the first stage of the optical detector 400 (which includes the first transistor Q1 and impedances seen by the first transistor Q1) to the sun current may need to be less than 70.

The photodiode current may be a very high impedance constant current source. As mentioned above, the frequency dependent emitter feedback circuitry 402 may be used to lower the effective first stage gain for direct sunlight (or other high intensity light sources). Voltage feedback to the photodiode D1 may not be sufficient to keep the current sufficiently below the maximum 20 mA. It may be beneficial for feedback mechanism to act on a separate lower impedance source to redirect the current away from the base of the first transistor Q1.

In this example, resistor RBase is approximately 100k ohm and resistor RCollector is approximately 100 ohm. A maximum total of 215 uA of current may be delivered to the base of the first stage transistor consisting of the photodiode's light dependent current source, which may include: 0 uA to 180 pA in full sun; an additional 1 pA or less of desired signal; around 35 uA stage stabilization current from RBase, which is connected in parallel with the photodiode D1. The resistor RBase may determine a minimum base current for the first transistor Q1.

The reverse biased capacitance of the photodiode D1 may be large compared to the desired signal. It may be beneficial for the voltage across the photodiode D1 to remain fairly constant. This large reverse biased capacitance may minimize current flow losses into the junction capacitance of the photodiode D1. The first transistor Q1 may also contribute some capacitance, but this additional capacitance may be relatively small (the first transistor Q1 is a small signal high speed device with no collector to base feedback multiplying its capacitance in this example). To minimize current flows into these capacitances, the cathode of the photodiode D1 is connected to a fixed supply voltage (e.g. 4.1 V), and the anode of the photodiode D1 is connected to the base of the first transistor Q1. The first transistor Q1 may present a base to emitter impedance of around 25 ohms, for example, even when the its collector is unpowered. The base emitter voltage may also remain fairly constant at around 0.6V.

As shown in FIG. 4, the frequency dependent emitter feedback circuitry 402 in this embodiment includes capacitor "Cemitter" and resistor "Remitter", connected in parallel, to the emitter of the first transistor Q1. The frequency dependent emitter feedback circuitry 402 may provide a low emitter feedback impedance at the modulation frequency of the IR light sources (LEDs), thereby producing only limited feedback at the modulation frequency. However, at the Step Clock rate (i.e. the rate at which light sources and optical receivers of the touch sensor are sequentially enabled/disabled), the impedance provided by the frequency dependent emitter feedback circuitry 402 is higher, thereby providing stronger feedback to reduce current induced by the sunlight.

The capacitor Cemitter and resistor Remitter are connected directly between the emitter and ground. However, other components or circuitry may also be connected between the emitter and ground in other embodiments. In this example, the resistor Remitter is 33 ohms resistor and the capacitor Cemitter is 22 nF, although other specific values may be chosen depending on the specific implementation details, including modulation frequency and Step Clock rate and/or other factors.

Figure 5:
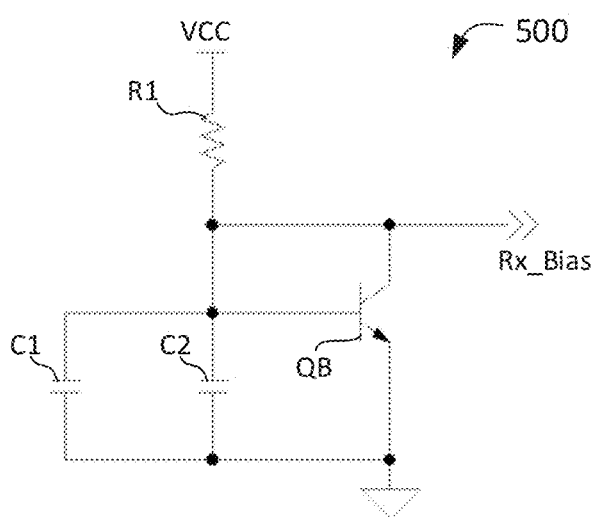
FIG. 5 is a schematic diagram of an example low impedance constant voltage source to supply a reference voltage according to some embodiments.

A low impedance constant voltage source may provide the reference voltage Rx_Bias input. That is, the low impedance constant voltage source may be connected to the base of the transmitter Q1. An example low impedance constant voltage source circuit 500 is shown in FIG. 5 and discussed below. The reference voltage Rx_Bias may be relatively fixed or constant and may shunt photodiode current away from the base of the first transistor Q1 as the emitter voltage of the first transistor Q1 rises.

In FIG. 4, the resistor RBias adds an impedance to the reference voltage Rx_Bias, which may be a much higher impedance than the base of the first transistor Q1. In this specific example, the resistor RBias is approximately 1.8 kOhm. Thus, the majority of current may still flow into the base of the first transistor Q1 when the emitter voltage is at a constant voltage. The constant voltage source may be designed to match the base to emitter voltage over a wide range of temperatures. However, if the emitter voltage rises slightly, the resistor's impedance may be much lower than the photodiode impedance so the current flow through it to the constant voltage source is large compared to the photodiode current.

The modulated light from light sources of the touch sensor, which is received by the optical detector, is modulated many times during a step clock period. The 22 nF capacitor value may have an impedance of around 10 ohms at the modulation frequency, lower than the 33 ohms resistor Remmiter in parallel with it. The gain of the first transistor Q1 may increases the effective impedance (e.g. to around 1.2 kOhm at the base of the first transistor Q1). This may still be much lower than the impedance of the photodiode D1. Thus, the current due to sunlight from the photodiode may be unaffected. However the resistance to the constant voltage source (1.8k in this example) may now only 1.5 times the effective impedance of 1.2 kOhm, so approximately ⅓ of the signal current may be diverted to the constant voltage source.

The photodiode current due to sun exposure may be almost constant over each step clock period. When the collector of the first transistor Q1 is powered the current through the emitter may rapidly rise to be the photodiode generated base current multiplied by the transistor gain Hfe. This emitter current charges the 22 uF capacitor until the current through the Remitter (e.g. 33 ohm) matches it. This matching may happen in just a couple or a few of modulation periods of the LED modulation signal. The voltage across the capacitor Cemitter may result in an increased base voltage. When the base of the first transistor Q1 no longer matches the constant voltage supply, current flows through the resistor RBias, which is a relatively low impedance source compared to the photodiode D1), thereby subtracting from the current from the photodiode D1 that flows into the base.

The feedback circuit 402 may be configured to approximately half the collector current caused by an expected maximum sun exposure, for example.

FIG. 5 is a schematic diagram of an example constant voltage source 500 to supply the reference voltage Rx_Bias shown in FIG. 4 according to some embodiments. The constant voltage source may track and compensate for thermal and batch manufacturing variations in the base to emitter junction voltage of multiple receiver first transistors Q1 (shown in FIG. 4) of optical detectors. As noted above, the term "constant" does not mean that the provided voltage is absolutely or precisely constant.

The constant voltage source 500 comprises a transistor QB, resistor R1 connected to the collector and base of the transistor QB. First and second capacitors C1 and C2 are connected in parallel between the base and the emitter of the transistor QB. The reference voltage Rx_Bias is taken from the collector. As one example, the first capacitor may be 10 uF and the second capacitor may be 1 uF. However, embodiments are not limited to the particular constant voltage source 500 shown.

The constant voltage source 500 may be connected to each optical detector in the system. For example, turning back to FIG. 1A, if each of the optical detectors Rx0 to Rx15 have the form of the optical detector 400 in FIG. 4, then the system 100 may further include the constant voltage source 500 of FIG. 5 connected to provide Rx_Bias to each of the optical detectors Rx0 to Rx15. The constant voltage source 500 may be included in the bezel circuitry of the touch sensor.

Figure 6:
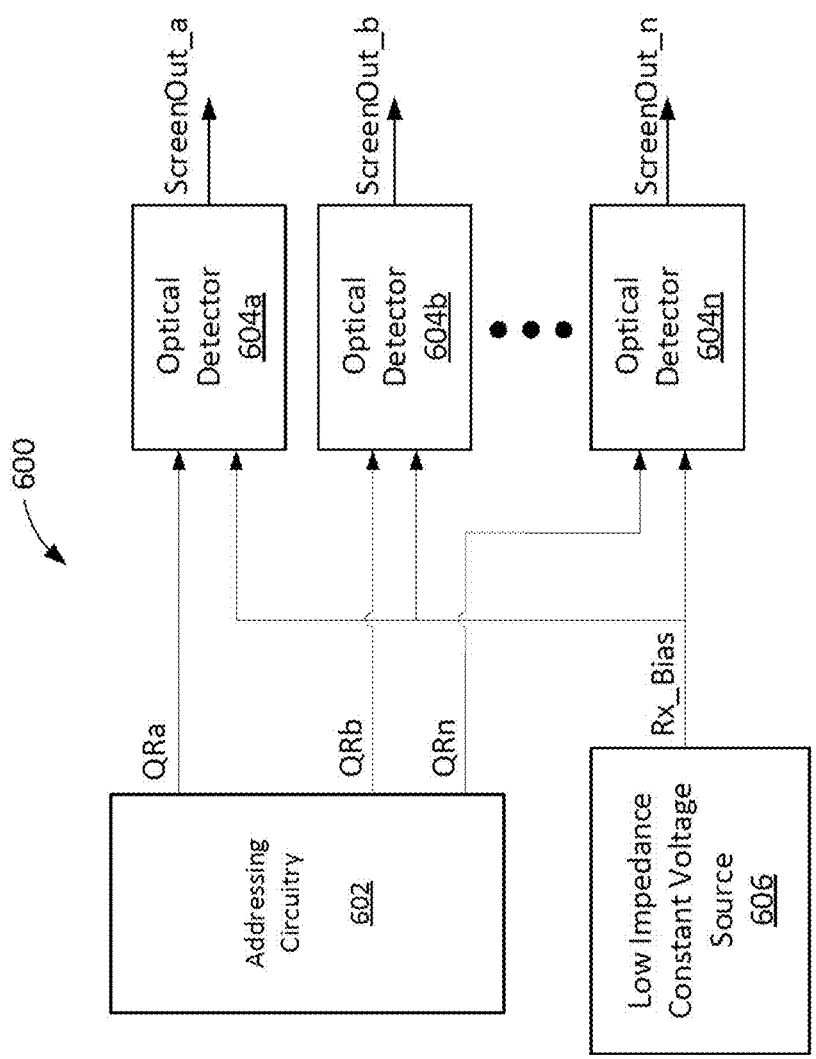
FIG. 6 is a schematic diagram of an example system including addressing circuitry, first and second optical detectors driven by the addressing circuitry, and a constant voltage source.

FIG. 6 is a schematic diagram of an example circuitry 600 for a touch sensor including addressing circuitry 602, a plurality of "n" optical detectors 604a to 604n that are selectively and sequentially driven by the addressing circuitry 602, and a low impedance constant voltage source 606. The optical detectors 604a to 604n in this example are each in the form of the example detector 400 shown in FIG. 4. However, the circuitry of one or more of the optical detectors 604a to 604n may vary in other embodiments. The low impedance constant voltage source 606 may be in the form of the example low impedance constant voltage source 500 shown in FIG. 5. However, the circuitry of the low impedance constant voltage source 606 may vary in other embodiments.

The low impedance constant voltage source 606 is connected to an input voltage VCC (e.g. 3.3V) and outputs the voltage Rx_Bias to each of the optical detectors 604a to 604n. The shared reference voltage Rx_Bias may help maintain a substantially constant voltage across the photodiodes of the optical detectors 604a to 604n, even when the optical detectors 604a to 604n are exposed to modulated sun or other noise.

The addressing circuitry 602 sequentially drives LEDs and optical detectors (including first and second optical detectors 604*a* and 604*b*) similar to the system 100 in FIGS. 1A and 1D. The addressing circuitry 602 may comprise any circuitry (e.g. digital logic) capable of sequentially enabling and disabling the optical detectors 604*a* to 604*n*. In this example, the addressing circuitry 602 outputs enable signals QRa to QRn the optical detectors 604*a* to 604*n* respectively. The addressing circuitry 602 may, for example, comprise one or more shift registers, and the addressing circuitry may receive "Shift Step Clock" and "Start_Pulse_RX_Shift" signals and output detector enable signals accordingly similar to the embodiment shown in FIGS. 1A to 1D. As another example, addressing circuitry 602 may include decoders for generating the enable signal. An example of addressing circuitry implemented with 3-to-8 decoders is described in International PCT Publication No. WO/2019/218074, filed May 16, 2019, the entire contents of which is incorporated by reference.

Outputs (ScreenOut_a to ScreenOut_n) of the optical detectors 604*a* to 604*n* together form a collective detector output (similar to ScreenOut in FIG. 1A) that may be input to a correlating filter of a touch sensor controller, such as the correlating filter 800 of FIG. 8 described below. The outputs (ScreenOut_a to ScreenOut_n) of the optical detectors 604*a* to 604*n* may be connected to a shared pull down load resistor to form the collective output, and the individual output of a given optical detector (604*a* to 604*n*) may only be driven when the corresponding enable signal is provided by the addressing circuitry 602.

Figure 7:
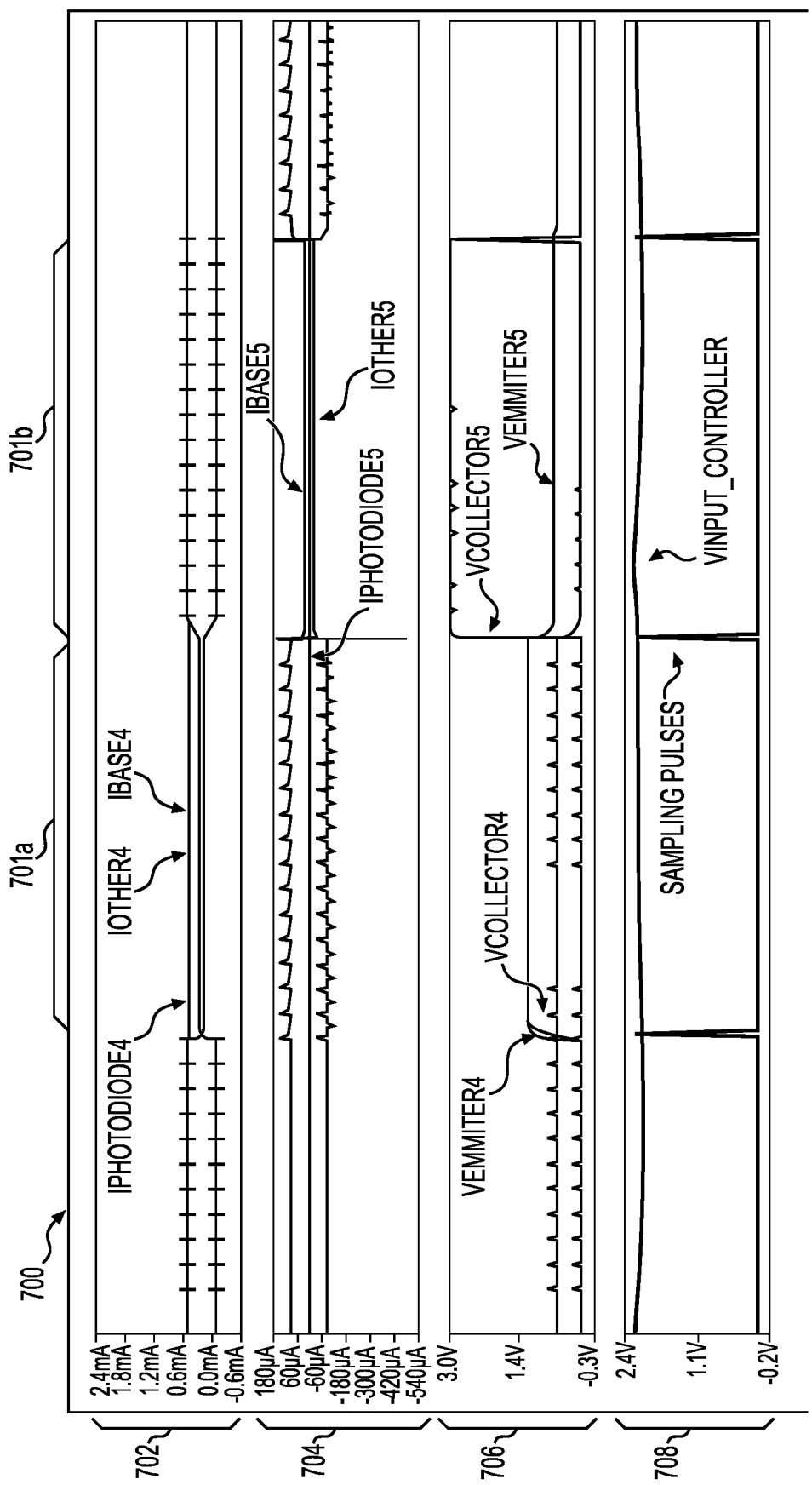
FIG. 7 shows simulation results of a simulation of a touch sensor system having optical detectors similar to the optical detector of FIG. 4.
Figure 7:
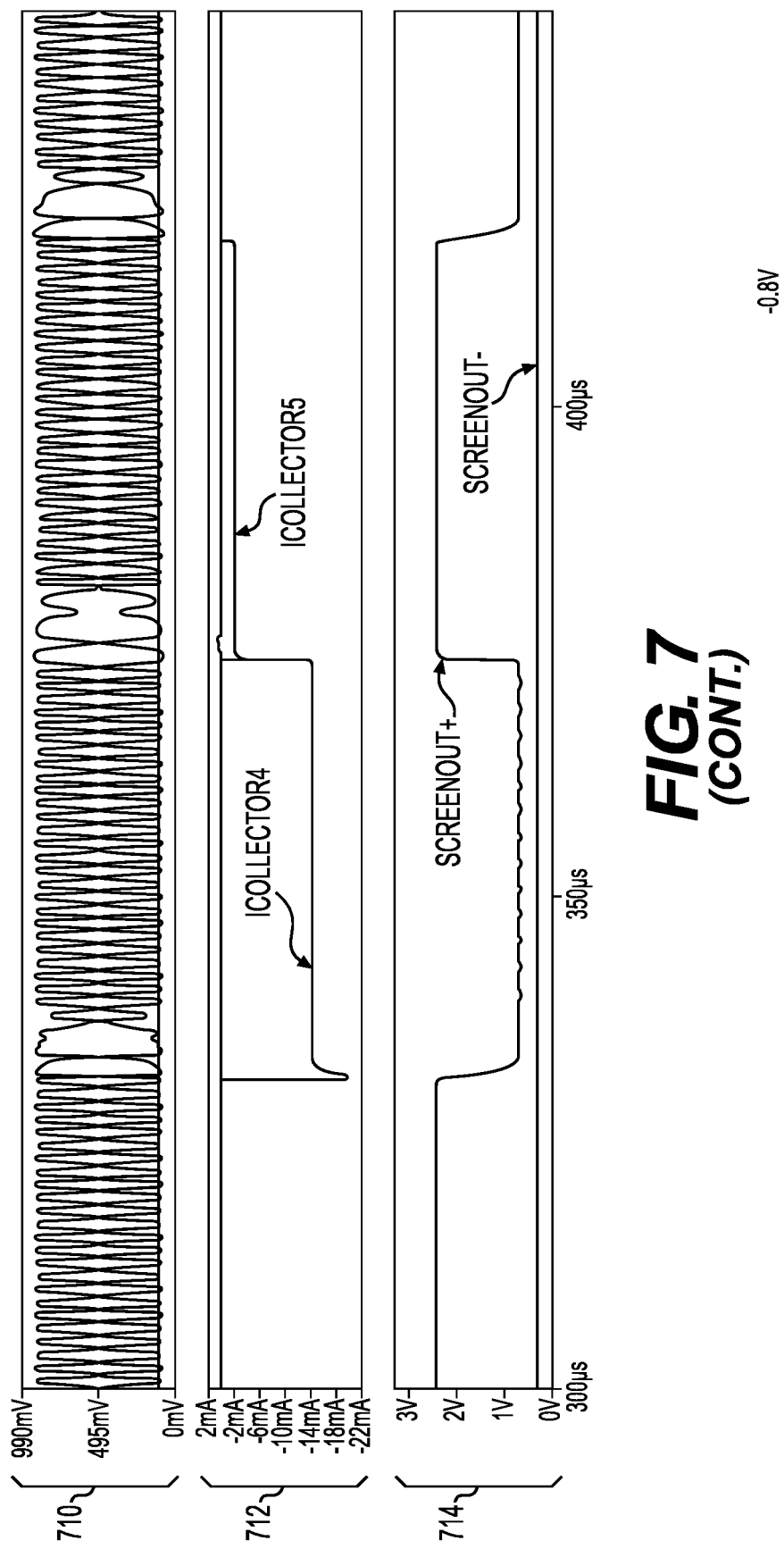

FIG. 7 shows simulation results 700 of a simulation of circuits in two sections of a bezel that are physically opposite to each other driven similarly to the system 100 in FIGS. 1A and 1D, where the LEDs with series resistors are driven directly from a shift register and the optical detectors Rx1 to Rx15 are each similar to the optical detector 400 in FIG. 4. The results shown in FIG. 7 include currents and voltages measures in the fourth and fifth optical detectors (Rx4 and Rx5) of the system. Figure seven shows graphs 702, 704, 706, 708, 710, 712 and 714. The fourth optical detector Rx4 is active over time period 701*a*. The fifth optical detector Rx5 is active over time period 701*b*.

The first graph 702 shows three currents: "Iphotodiode4", "Iother4" and "Ibase4". The current Iphotodiode4 is the simulated current from the photodiode D1 of the fourth optical detector Rx4. Extreme sun exposure on the fourth optical detector is simulated, which results in a high current due to the sun plus the modulation current due to the modulated light in the fourth light source LED4 that is active while the fourth optical detector Rx4 is active. The current Ibase4 is the current through the base of the first transistor Q1 of the fourth optical detector Rx4. The current Iother4 is a simulated current toward the base of the first transistor Q1 from combined connections to a +4V rail and to the bias voltage (Rx_Bias).

The second graph 704 shows three currents: "Iphotodiode5", "Iother5" and "Ibase5". The current Iphotodiode5 is the simulated current from the photodiode D1 of the fifth optical detector Rx5. No sun exposure is simulated on the fifth optical detector is simulated, which results in a high current due to the sun plus the modulation current due to the modulated light in the fifth light source LED5 that is active while the fifth optical detector Rx5 is active. The current Ibase5 is the current through the base of the first transistor Q1 of the fifth optical detector Rx5. The current Iother5 is a simulated current toward the base of the first transistor Q1 from combined connections to a +4V rail and to the bias voltage (Rx_Bias).

The third graph 706 shows the following simulated voltages: "Vemitter4", "Vcollector4", "Vemitter5" and "Vcollector5". The voltage Vemitter4 is the emitter voltage of the first transistor Q1 in the fourth optical detector Rx4. The voltage Vcollector4 is the collector voltage of the first transistor Q1 in the fourth optical detector Rx4. The voltage Vemitter5 is the emitter voltage of the first transistor Q1 in the fifth optical detector Rx5. The voltage Vcollector5 is the collector voltage of the first transistor Q1 in the fifth optical detector Rx5. The initial curve of the voltage Vemitter4 at the start of time period 701*a*, and the initial curve of the voltage Vemitter5 at the start of time period 701*b* is a result of the emitter RC time-constant.

The fourth graph 708 shows "Vinput_controller" and "Sampling Pulses" signals. The signal "Vinput_controller" is the voltage input to the controller (e.g. controller 102 of FIG. 1A) and is equivalent to the "Analog Out" signal shown in FIG. 8, which may be input to the ADC 130 of the microcontroller 118 in FIG. 1. The "Sampling Pulses" signal is the sample pulses input to the A/D.

The fifth graph 710 shows simple modulation pattern differential signals prior to sampling. The "sample and hold" sampling pulses are aligned with minima of the modulation pattern differential signals.

The sixth graph 712 shows currents "Icollector4" and "Icollector5". The current Icollector4 is the collector current of the first transistor Q1 of the fourth optical detector Rx4. The current Icollector5 is the collector current of the first transistor Q1 of the fifth optical detector Rx5.

The seventh graph 714 shows the collective output voltage signal "ScreenOut+" from the optical detectors as well as a pseudo differential version of that signal "ScreenOut−". The pseudo differential signal "ScreenOut−" may be generated in the bezel circuitry of an optical touch sensor, for example. The pseudo differential signal "ScreenOut−" may be generated by an optional pseudo-balancing circuit. The signals "ScreenOut−" and "ScreenOut+" may both be provided as an input to the filter-amplifier 802 of FIG. 8, for example. The pseudo-balancing circuit may be used to cancel power modulation related and interconnect RF pickup noise on the signal output from the optical detectors. For example, the pseudo balancing circuit may present a similar impedance as the received "ScreenOut+". An example pseudo balancing circuit and its function is further explained in International Patent Cooperation Treaty (PCT) Patent Application No. PCT/CA2019/050666 (published as WO2019/218074), which is incorporated herein by reference in its entirety. Again, extreme sun exposure is demonstrated in time period 701*a* with no sun exposure in time period 701*b*.

This difference between exposed and non-exposed detectors may also cause large glitches or inaccuracies at transitions in the correlating filter 120 (FIG. 1A) at the transition between one optical detector being driven and the next optical detector being driven. The times of such transitions, which occur at a frequency set by the shift step clock period, may be referred to herein as "transition times". Due to the potential for such glitches at transition times, it may be desirable to modify the system to better cope with such issues caused by strong sunlight.

Figure 8:
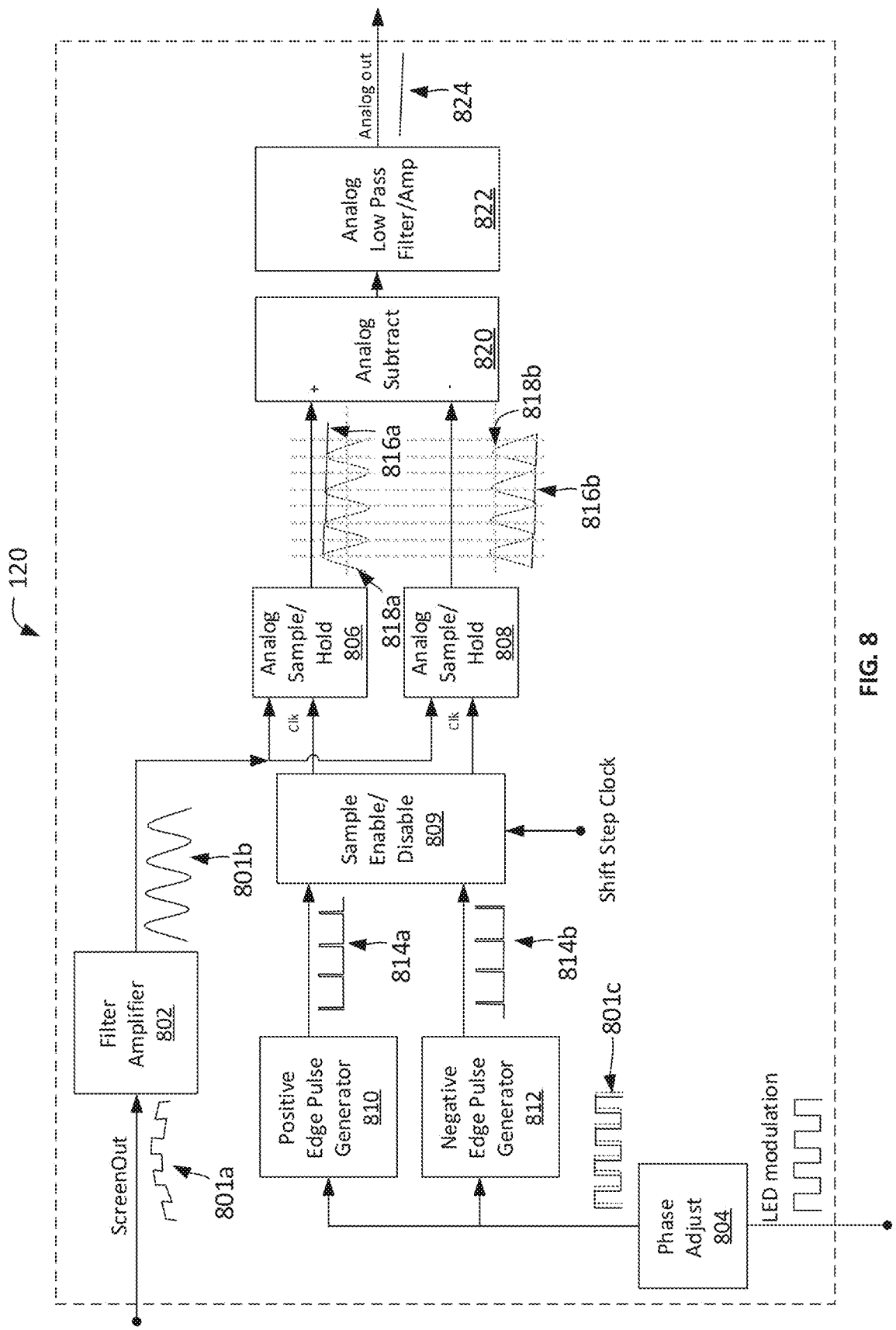
FIG. 8 is a functional block diagram of an example embodiment of a correlating filter including sampling enable/disable circuitry that may be used in a touch sensor system according to some embodiments.

FIG. 8 is a functional block diagram of an example embodiment of a correlating filter 120 that may be used in the touch sensor system 100 of FIGS. 1A and 1D or in other touch sensor systems.

The correlating filter 120 may work with a variety of digital modulation patterns. The digital modulation pattern used may be balanced over the shift step clock period (e.g.

a 110100101100 pattern, or a simple 101010 pattern, and so on) The term "balanced" in this context means that the number of "1's" is equal to the number of "0's" in the modulation pattern. It may be preferable to keep a latter portion of the pattern balanced over that portion as well. In one embodiment a simple alternating modulation pattern is used (i.e. 101010 and so on) with 24 chips per shift step clock period. As another example, the pattern may have 32 or 64 chips per step-clock period. It may be beneficial or simplify design if the chip rate is an exact division of the clock frequency of the microcontroller 118, although embodiments are not limited to any particular chip rate or modulation pattern. In FIG. 8, only 8 chips for the example received signal 801a is shown for clarity and illustrative purposes. Increasing the number of chips per shift step clock may improve noise rejection, but may include faster optics to work or may reduce the rate a complete sensor area can be scanned.

A first input receives the "ScreenOut" signal (i.e. raw collective detector output), which is the collective output of the optical detectors Rx0 to Rxn (FIGS. 1 and 5). The signal is a modulated (due to the modulation of the LED light incident on the detectors) and will typically include noise, such as ambient noise. A graphical representation of an example input "ScreenOut" signal portion 801a is shown for illustrative purposes. The "ScreenOut" signal input is first filtered and amplified by a filter-amplifier 802, which generates a pre-conditioned detector output signal. The filter-amplifier 802 in this example is an analog band pass filter-amplifier. An example pre-conditioned detector output signal portion 801b is shown.

The received signal from block 802 is then input into both of a first analog-sample-and-hold block 806 and a second analog-sample-and-hold block 808.

The relative phase of the pre-conditioned detector output signal and the sampling pulses may depend on the delays through the circuitry and the filter frequencies selected.

The LED modulation signal is input to the correlating filter 120. The LED modulation signal acts as a reference signal for timing sampling of pre-conditioned detector output signal. The LED modulation signal is input into a fixed phase adjust block 804.

The phase adjust block 804 may be used to ensure the received filtered signal resulting from a modulation state change is sampled by a pulse generated from the same modulation state change edge and the phase adjustment performed by block 804 may improve or maximize the efficiency of the sample-and-hold blocks 806 and 808, by ensuring the first and second sample-and-hold blocks 806 and 808 take samples at or near to peaks and troughs of the signal respectively. Small tweaks in the phase may also be done to avoid sampling during digital glitches in the 3.3V power rail. An example phase adjusted LED modulation signal 801c is shown. The phase adjustment may be a delay.

The phase-adjusted LED modulation signal is input to both a positive edge pulse generator 810 and a negative edge pulse generator 812.

The positive edge pulse generator 810 generates a series of short but defined duration pulses (graphically represented by partial pulse train 814a) at the positive edges of the phase-adjusted LED modulation signal. Those pulses are input as a clock signal for the first analog-sample-and-hold block 806 to provide peak sample timing. The negative edge pulse generator 812 generates a similar series of short pulses (graphically represented by partial pulse train 814b) at the negative edges of the phase-adjusted LED modulation signal. Those pulses are input as a clock signal for the second analog-sample-and-hold block 808 to provide trough sample timing.

The first analog-sample-and-hold block 806 samples the received (pre-conditioned) signal from the optical detectors Rx0 to Rxn at the signal peaks, as timed by the pulses from the positive edge pulse generator 810. For each sample, the analog sample value is held until the subsequent sample is taken. The output from the first analog-sample-and-hold block 806 is, thus, a correlated maximum analog signal (graphically illustrated by example signal portion 816a and stippled line received signal reference portion 818a, which matches received signal portion 801c).

Similarly, the second analog-sample-and-hold block 808 samples the received (pre-conditioned) signal from the optical detectors Rx0 to Rxn at the signal troughs or valleys, as timed by the pulses from the negative edge pulse generator 812. Again, for each sample, the analog sample value is held until the subsequent sample is taken. The output from the second analog-sample-and-hold block 808 is, thus, a correlated minimum analog signal (graphically illustrated by example signal portion 816b and stippled line received signal reference portion 818b, which matches received signal portion 801b). The second analog-sample-and-hold block 808 may samples an inverted version of the received signal with a similar phase relative to the first analog-sample-and-hold block 806. The outputs of both sample and holds may be mixed and filtered as explained below.

In other embodiments, the first and second sample-and-hold blocks may both sample the non-inverted received signal and each output separately filtered using a resistor and a capacitor. The difference between the filtered signals may be extracted using a differential amplifier.

In the example of FIG. 8, the correlated maximum and correlated minimum signals output from the first and second analog-sample-and-hold blocks 806 and 808 are input to an analog subtractor 820 or combining circuit, which subtracts the correlated minimum from the correlated maximum. The resulting output from the analog subtractor 820 is then input to analog low pass filter-amplifier 822 where it is low pass filtered and amplified to provide a correlated and filtered analog output. The analog low pass filter-amplifier 822 averages this signal over the period while each individual LED/detector light path is being measured. A graphical representation of an example correlated/filtered output signal portion 824 is shown for illustrative purposes. In some embodiments, rather than an analog low pass filter-amplifier, the analog output may be converted to digital signals using one or more Analog to Digital converters and the difference may be digitally calculated.

The correlating filter 120 also includes sample enable/disable circuitry 809 that is operable to enable and disable sampling by the first and second sample-and-hold blocks 806 and 808. In this example, the sample enable/disable circuitry 809 receives the sampling pulses from the positive edge pulse generator 810 and the negative edge pulse generator 812. While sampling is enabled (i.e. when the sample enable/disable circuitry 809 has not been triggered), the sampling pulses are passed through to the first and second sample-and-hold blocks 806 and 808. The sample enable/disable circuitry 809 temporarily disables or suppresses sampling by the sample-and-hold blocks 806 and 808 when triggered. In this example, the sample enable/disable circuitry 809 is triggered to temporarily suppress sampling every Shift Step Clock period. That is, the edges of the Shift Step Clock signal trigger the sample enable/disable circuitry 809 to temporarily disable or suppress sampling by the sample-and-hold blocks 806 and 808. The sampling enable/disable circuitry 809 may also be referred to as simply "sampling disable circuitry" that temporarily disables the sampling.

The duration of the sampling suppression may be selected based on an observed or expected glitch duration. Glitches due to changing the driven optical detector may, for example, last for approximately 3 modulation chip periods, and the duration of suppression may be selected to extend through that time. The duration of suppression may be set by the monostable pulse width. In other words, the monostable pulse width may be adjusted to cover the sample pulses that it is desired to suppress.

Figure 9:
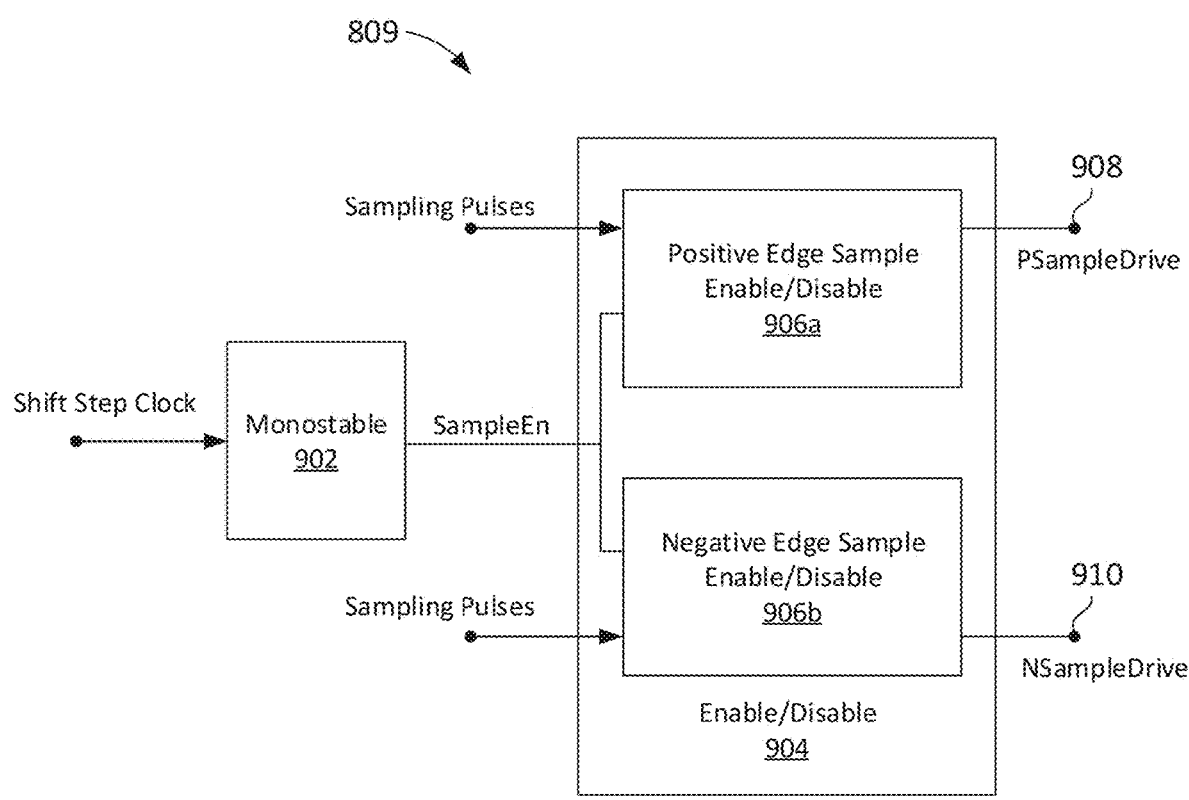
FIG. 9 is a functional block diagram of an example implementation of enable/disable circuitry of the correlating filter of FIG. 8 according to some embodiments.

FIG. 9 is a functional block diagram of an example implementation of the enable/disable circuitry 809 of FIG. 8 according to some embodiments. In this example, the sample enable/disable circuitry 809 includes a monostable module 902 and an enable/disable module 904. The monostable module 902 receives the Shift Step Clock signal as an input and generates a Sample Enable output signal "SampleEn". The enable/disable module 904 receives the Sample Enable output signal from the monostable module 902 and the sampling pulses from the positive edge pulse generator 810 and the negative edge pulse generator 812 (shown in FIG. 8). In this example, the enable/disable module 904 includes a Positive Edge Sample Enable/Disable block 906a that enables and disables the sampling pulses from the positive edge pulse generator 810, and a Negative Edge Sample Enable/Disable block 906b that enables and disables the sampling pulses from the negative edge pulse generator 812.

When the Sample Enable output signal "SampleEn" is high, the sampling pulses are passed through to outputs 908 and 910 for input to the respective sample-and-hold blocks 806 and 808 (shown in FIG. 8). When the Sample Enable output signal "SampleEn" is low, the sampling pulses are not output to the sample-and-hold blocks 806 and 808. Alternatively, a low input may be used for enabling output of the pulses, with a temporary high input suppressing the pulses, when triggered. In this example, each of the Positive Edge Sample Enable/Disable block 906a and the Negative Edge Sample Enable/Disable block 906b comprises a respective "AND" gate that receives the corresponding sampling pulses and the sampling enable signal "SampleEn" as input. Other logic gates (e.g. inverted logic gates) could also be used to accomplish equivalent functionality.

The monostable module 902 receives the Shift Step Clock signal as input. As discussed above, in the system 100 of FIG. 1A, the Shift Step Clock signal also controls shifting which optical detector of the plurality of optical detectors Rx0 to Rx15 is active.

In FIG. 9, the Shift Step Clock signal triggers the monostable module 902 to switch from the default high output for the Sample Enable output signal to a temporary low output at the edge of every clock cycle of the signal. Thus, at the point of transition from driving one optical detector to driving the next optical detector, the sampling pulses output to the sample-and-hold blocks 806 and 808 are temporarily suppressed, and sampling of the collective detector output is also suppressed. In other embodiments, the sequential transitions between activated optical detectors may not be periodic as a function of a clock cycle (e.g. not tied to the cycle of the Shift Step Clock signal), and another method may be used to trigger the enable/disable circuitry 809 at points of transitions between optical detectors.

FIG. 10 is a schematic diagram showing a potential circuitry implementation of the example enable/disable circuitry 809 of FIGS. 8 and 9. FIG. 10 shows example circuitry implementing the monostable module 902 and the enable/disable module 904 including the positive edge sample enable/disable block 906a and the negative edge sample enable/disable block 906b. Embodiments are not limited to the specific circuitry shown in FIG. 10, which is provided simply by way of example. The monostable 902 generates a pulse output when triggered, which is used to disable sampling for a duration of time The monostable 902 in this embodiment is implemented with a D-type Flip Flop (labelled as "D Flop"). In FIG. 10, capacitor C-EnTime and resistor R-EnTime may determine the monostable pulse width of output the monostable output (labelled as "SampeEn"), which in turn sets the duration of suppression of sampling pulses. By way of example, the D-type flip flow may be a SN74LVC2G74DCUR flip flop by Texas Instruments™. The capacitor C-EnTime may be 1 nF, and the resistor R-EnTime may be 10 k ohms. However, these values may vary and are only provided by way of example. The optimum value of R-EnTime may be related to the duration of the step clock induced glitches and may not be largely dependent on the chip rate or step clock periodicity. The value selected for R-EnTime may be adjusted significantly depending on the duration and amplitude of received signal disturbances triggered when selected optical devices are switched to other optical devices. The pulse width may be in the range of 1 to 16 chips of the LED modulation signal (i.e. light source modulation frequency). The pulse width may be between 3 and 5 chips in some embodiments. The value selected for R-EnTime may also be adjusted slightly so the change due to the monostable output changes occur cleanly between chip sample pulses.

The positive edge sample enable/disable block 906a and the negative edge sample enable/disable block 906b in this example each include a respective logic AND gate 1002a and 1002b. The sample pulses from the positive edge pulse generator 810 (FIG. 8) are one input of the AND gate 1002a of the positive edge sample enable/disable block 906a. The sample pulses from the negative edge pulse generator 812 (FIG. 8) are one input of the AND gate 1002b of the negative edge sample enable/disable block 906b. The SampleEn output of the monostable 902 is routed to the other inputs of both AND gates 1002a and 1002b so that the sample pulses do not pass through the AND gates 1002a and 1002b during the suppression duration triggered by the monostable 902 for each cycle of the Shift Step Clock signal.

Figure 11:
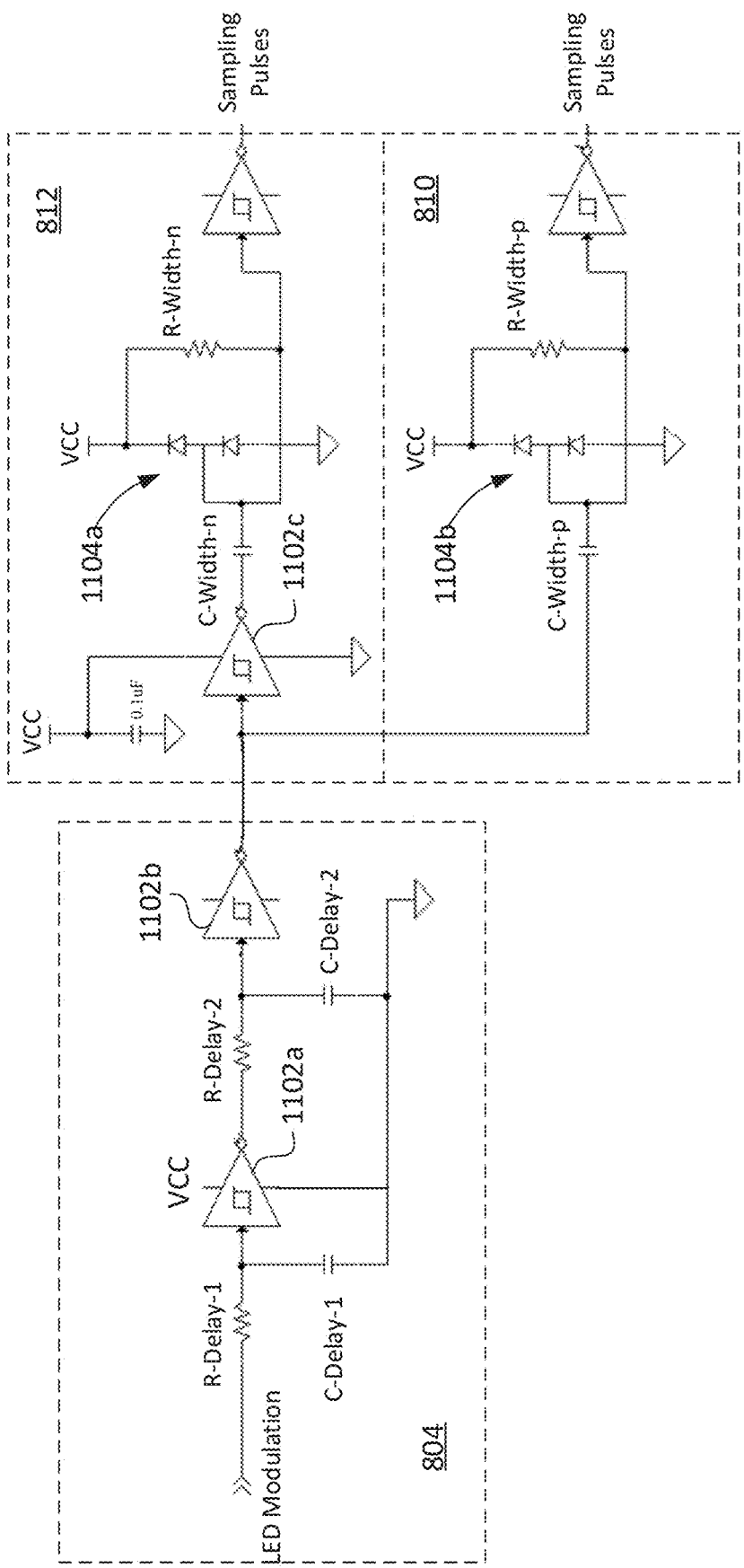
FIG. 11 is a schematic diagram showing a potential circuitry implementation of sample timing adjust circuitry, a positive edge pulse generator and a negative edge pulse generator.

FIG. 11 is a schematic diagram showing a potential circuitry implementation of sample timing adjust circuitry 804, as well as the positive edge pulse generator 810 and the negative edge pulse generator 812 of FIG. 8. Embodiments are not limited to the specific circuitry shown in FIG. 11, which is provided simply by way of example.

The sample timing adjust circuitry 804 includes first and second inverting Schmitt triggers 1102a and 1102b connected in series. A resistor R-Delay-1 is connected to the input of the first Schmitt trigger 1102a and another resistor R-Delay-2 is connected in series between the output of the first Schmitt trigger 1102a and the input of the second first Schmitt trigger 1102b. Capacitances C-Delay-1 and C-Delay-2 are connected in parallel to ground from the inputs of the first and second inverting Schmitt triggers 1102a and 1102b respectively.

By way of example, the inverting Schmitt triggers 1102a and 1102b may, for example, be 74LVC14A hex inverting Schmitt triggers. The two inverting Schmitt triggers 1102a and 1102b may cancel out timing variations due to the threshold variations of the Schmitt triggers 1102a and 1102b.

The resistances R-Delay-1 and R-Delay-2 may each have the same resistance value (e.g. 10k ohm). The capacitances C-Delay-1 and C-Delay-2 may each have the same capacitance value (e.g. 56 pF).

The sample timing adjust circuitry 804 receives the LED Modulation signal as input and outputs a timing adjusted LED Modulation signal.

The positive edge pulse generator 810 and negative edge pulse generator 812 each receive the timing adjusted LED Modulation signal as input. The positive edge pulse generator 810 and negative edge pulse generator 812 each include respective pulse generation circuitry (1104a or 1104b) that convert the timing adjusted LED Modulation signal into pulses. The negative edge pulse generator 812 includes a third inverting Schmitt trigger that inverts the timing adjusted LED Modulation signal prior to the respective pulse generation circuitry 1104a. The positive edge pulse generator 810 generates sample pulses corresponding to positive edges of the timing adjusted LED Modulation signal, while the negative pulse generator 812 generates sample pulses corresponding to negative edges of the timing adjusted LED Modulation signal.

The pulse generation circuitry 1104a of the positive edge pulse generator 810 in this example includes a capacitor C-Width-p and resistor R-Width-p shown in FIG. 11, which may be 56 pF and 10k ohm respectively. The pulse generation circuitry 1104b of the negative edge pulse generator 812 in this example includes a capacitor C-Width-n and resistor R-Width-n, which may have the same capacitance and resistance values as for the pulse generation circuitry 1104a.

It is to be understood that the example circuitry shown in FIGS. 9 and 10, including the example circuit element values provided below (e.g. resistance, capacitance, etc.) are only by way of example and do not limit the disclosure to those examples.

Figure 12:
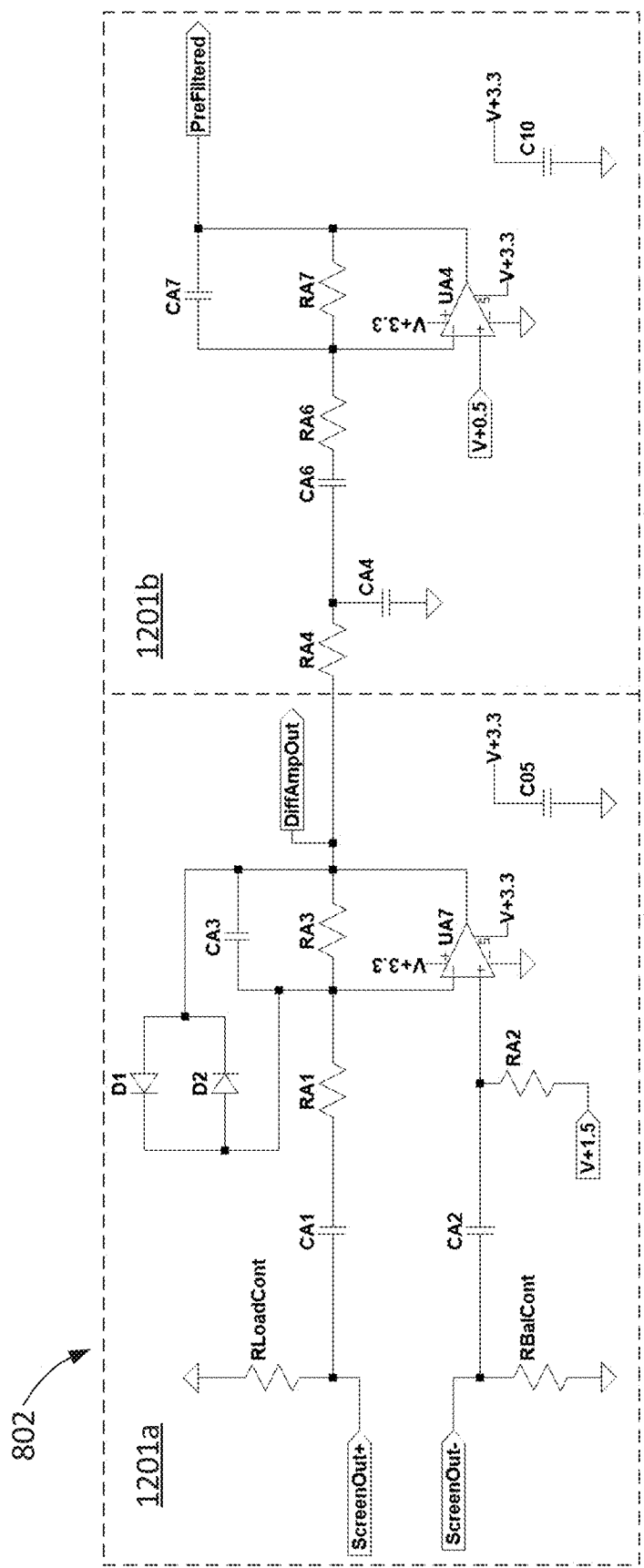
FIG. 12 is a schematic diagram showing example circuitry to implement a filter-amplifier and a fixed phase adjust block of the correlating filter of FIG. 8.

FIG. 12 is a schematic diagram showing example circuitry to implement the filter-amplifier 802 and the fixed phase adjust block 804 of the correlating filter 120 of FIG. 8. The filter-amplifier 802 and the fixed phase adjustment block 804 may help optimize the incoming signals' alignment to the sampling pulses used in the correlating filter 120. The filter-amplifier 802 includes a first amplifier stage 1201a and a second amplifier stage 1201b.

The example filter-amplifier 802 comprises: resistors RLoadCont, RBalCont, RA1, RA2 and RA3; capacitors CA1, CA2, CA3 and C05; diodes D1 and D2; and amplifier UA7 connected as shown. In this example: RLoadCont, RBalCont and RA1 are each 3.3 kOhm; RA2 is 3 kOhm; RA3 is 47 kOhm; CA1 and CA2 are each 330 pF; CA3 is 15 pF; C05 is 0.1 pF; Diodes D1 and D2 are BAV99LT1G diodes; and the amplifier UA7 is a LTC6252 amplifier chip. In FIG. 9, "V+3.3" represents connections to a 3.3 V rail, and "V+1.5" represents a 1.5 V input. However, embodiments are not limited to this circuitry or component values.

The example fixed phase adjust block 804 comprises: resistors RA4, RA6 and RA7; capacitors CA4, CA6, CA7 and C10, and amplifier UA4. In this example, RA4 and RA6 are each 3.3 kOhm; RA7 is 47 kOhm; CA4 and CA6 are each 330 pF; CA7 is 15 pF; C10 is 0.1 pF; and the amplifier UA4 is a LTC6252 amplifier chip. However, embodiments are not limited to this circuitry or component values.

Collectively, this portion of the correlating filter 120 may be referred to as the "front-end receiver". This front-end may reduce or eliminate low modulations significantly above and below the modulation frequency and amplifies the desired signal sufficiently so sampling noise that will be picked up in the sample and hold blocks 806 and 808 (FIG. 8) will not be too significant. The AC filtering may include eliminating steady levels from sunlight etc. The amplifier UA1A is an AC coupled differential receiver that is configured as a band pass amplifier, an RC phase adjustment, another band pass filter. It is to be understood that the particular component values, arrangement and voltage reference values may vary in different embodiments.

All received signals from the optical receivers (e.g. from Rx0 to Rxn in FIG. 1A) are time multiplexed into the "ScreenOut+" signal input shown in FIG. 12. Voltage modulations in the ground and voltage rails (3.3V in this example) may arise due to the track resistances in the cable between the screen bezel and the controller. Such modulations may result a on optical detector output signal being modulated even if the light path to that detector is blocked. In this embodiment, the optional input signal "ScreenOut–" is a differential version of the "ScreenOut+" signal that is included to reduce or eliminate such cable induced modulations. More particularly, the "ScreenOut–" signal is output from an impedance balancing circuit to approximate the level of cable induced modulation back to the controller. Since the correlating filter 120 of the controller is differential, it may cancel out the cable induced modulation, thereby leaving the desired signal. In the specific design of FIG. 12, the "ScreenOut" signal may simply pick up the 3.3V voltage rail at an impedance matched to the receivers (e.g. Rx0 to Rxn). In other embodiments, the circuit may be modified to generate a true differential version of the "ScreenOut+" signal using a differential output Op-amp. This example design includes non-linear clipping (by diodes D1 and D2) in the filter-amplifier 802 to absorb rapid transients that are larger than the desired signal.

Figure 13:
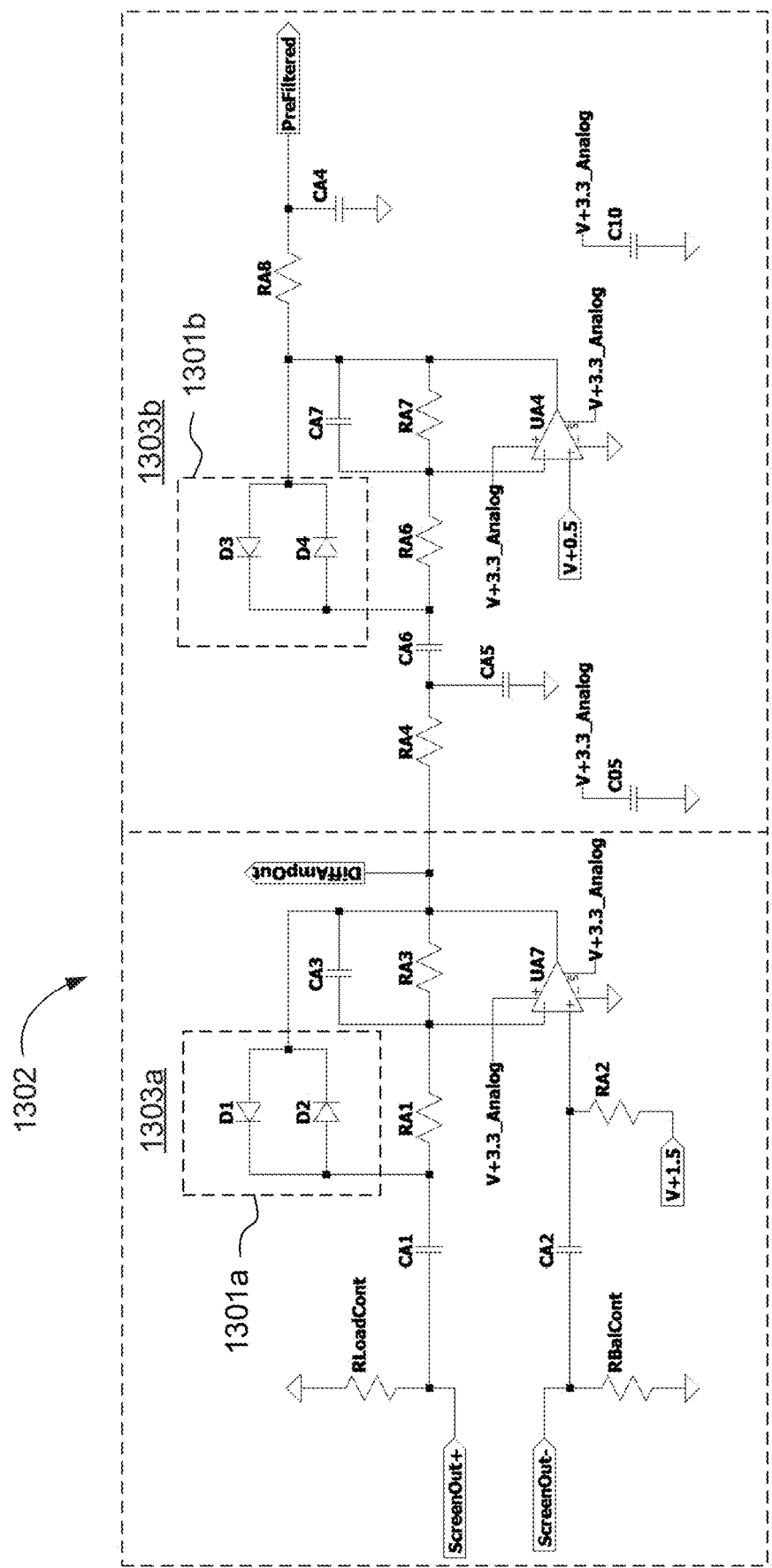
FIG. 13 is a schematic diagram showing example circuitry to implement an alternate filter-amplifier.

FIG. 13 is a schematic diagram showing example circuitry to implement an alternate filter-amplifier 1300 that may be used for the filter amplifier 802 in FIG. 8. The filter-amplifier 1300 includes a first stage 1303a and a second stage 1303b. The first stage 1303a of the example filter-amplifier 1302 comprises: resistors RLoadCont, RBalCont, RA1, RA2 and RA3; capacitors CA1, CA2, CA3 and 005; diodes D1 and D2; and amplifier UA7 connected as shown. In this example: RLoadCont and RBalCont are each 75 kOhm; RA1 and RA2 are 3.3 kOhm; RA3 is 220 kOhm; CA1 and CA2 are each 300 pF; CA3 is 1.5 pF; Diodes D1 and D2 are BAV99LT1G diodes; and the amplifier UA7 is a LTC6252 amplifier chip. However, embodiments are not limited to this circuitry or component values.

The second stage 1303b of the example filter-amplifier 1302 comprises: resistors RA4, RA6, RA7 and RA8; capacitors CA4, C05, CA5, CA6, CA7 and C10; diodes D3 and D4; and amplifier UA4 connected as shown. In this example: RA4 is 100 Ohm; RA6 is 3.3 kOhm; RA7 is 27 KOhm, RA8 is 1.4 kOhm; CA4 is 130 pF; CA5 and CA6 are 300 pF; CA7 is 27 pF; C05 and C10 are each is 0.1 pF; Diodes D3 and D4 are BAV99LT1G diodes; and the amplifier UA4 is a LTC6252 amplifier chip. However, embodiments are not limited to this circuitry or component values.

The first stage 1303a, when handling only the desired AC modulation signal, has a gain and frequency response determined by the relative impedance of resistor RA1 and the combined negative feedback impedance of CA3 and RA3. The first stage 1303a is DC biased for maximum symmetry at around half VCC (1.5 V). The second stage 1303b, when handling only the desired AC modulation signal, has a gain and frequency response determined by the relative impedance of resistor RA6 and the combined negative feedback impedance of CA7 and RA7 (27k). The second stage 1303b is DC biased so its output stays within the 0V to 1V input range of the sample and holds circuits (e.g. 0.5 V).

The filter-amplifier 1200 includes clipping circuitry 1301a and 1301b in the first and second stages 1303a and 1303b respectively. The clipping circuitry 1301a and 1301b may absorb rapid transients that are much larger than the desired signal. Clipping circuitry 1301a in this embodiment includes first and second small signal clipping diodes D1 and D2 wired in the opposite orientation in parallel connected between the inverting amplifier UA7 output and the amplifier side of the input decoupling capacitor "CA1". Clipping circuitry 1301b in this embodiment includes third and fourth small signal clipping diodes D3 and D4 wired in the opposite orientation in parallel connected between the inverting amplifier UA4 output and the amplifier side of the input decoupling capacitor "CA6".

When the filter-amplifier 1302 output reaches a threshold, the clipping circuitry 1301a and 1301b is activated to limit the filter-amplifier 1302 output. For example, when a very large level change comes from the touch circuitry (i.e. output from the optical receivers) and the voltage from each amplifier output to its input resistor exceeds 0.5V, the clipping diodes conduct, thereby limiting the output to +/−0.5V from the amplifiers average voltage. The activated diodes also rapidly charge/discharge the input capacitor, CA1 for stage 1 and CA6 for stage 2. In this way, the clipping diodes, when activated, cause the transient signal to be rapidly negated. After this transient signal negation, each amplifier stage 2603a and 2603b rapidly returns to its normal gain and frequency operation.

Figure 14:
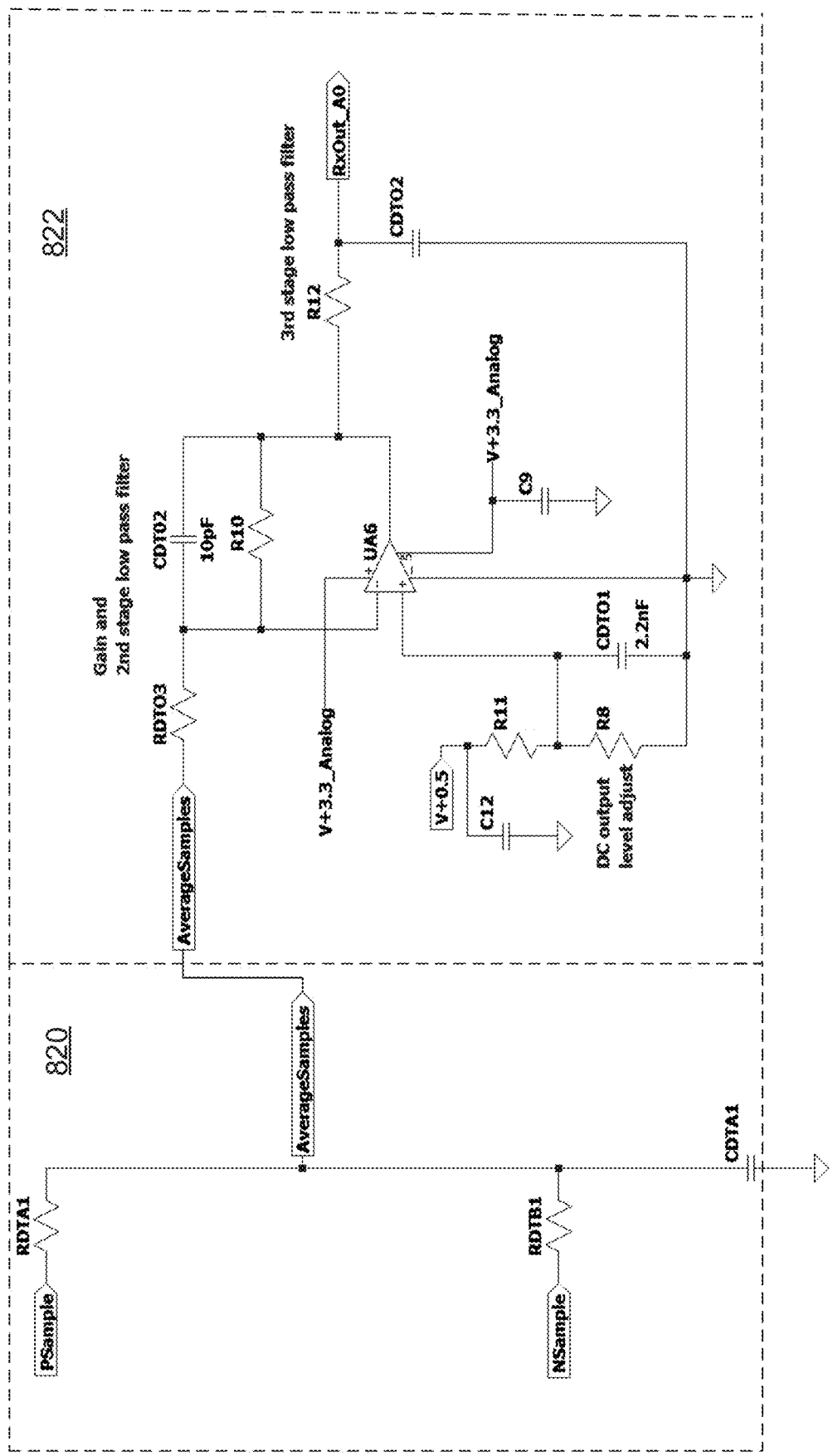
FIG. 14 is a schematic diagram showing example circuitry implementing the analog low pass filtering mixer and analog low pass filter-amplifier of the correlating filter of FIG. 8.

FIG. 14 is a schematic diagram showing example circuitry implementing the analog low pass filtering mixer 820 and analog low pass filter-amplifier 822 of a pattern correlating filter 120 in FIG. 8. The analog low pass filtering mixer 820 comprises resistors RDTA1 and RDTB1 that are each 4.75 kOhm in this example.

The analog low pass filter-amplifier 2822 comprises: resistors RDTO3, R8, R10, R11 and R12; capacitors CDT01, CDT02, CDT02, C9 and C12, and amplifier UA6. In this example, RDTO3 is 75 kOhm; R8 is 10 kOhm; R10 is 560 kOhm; R11 is 100 Ohm; R12 is 2.7 kOhm; CDT01 is 2.2 nF; CDT02 is 10 pF; CDT02 is 2.2 nF; C9 and C12 are each 0.1 pF; and UA4 is a LTC6252 amplifier chip. However, embodiments are not limited to this circuitry or component values.

A low pass filtering mixer (i.e. analog subtractor 820 in this example) mixes the outputs of the two sample and holds together and low pass filters the signal. This results in uncorrelated signal variations being largely attenuated, but the correlated signal variations being unattenuated.

Filter-amplifier 822 further low pass filters the desired signal and amplifies it and adds a DC offset to align its output signal with the microcontroller's A/Ds input levels.

Figure 15:
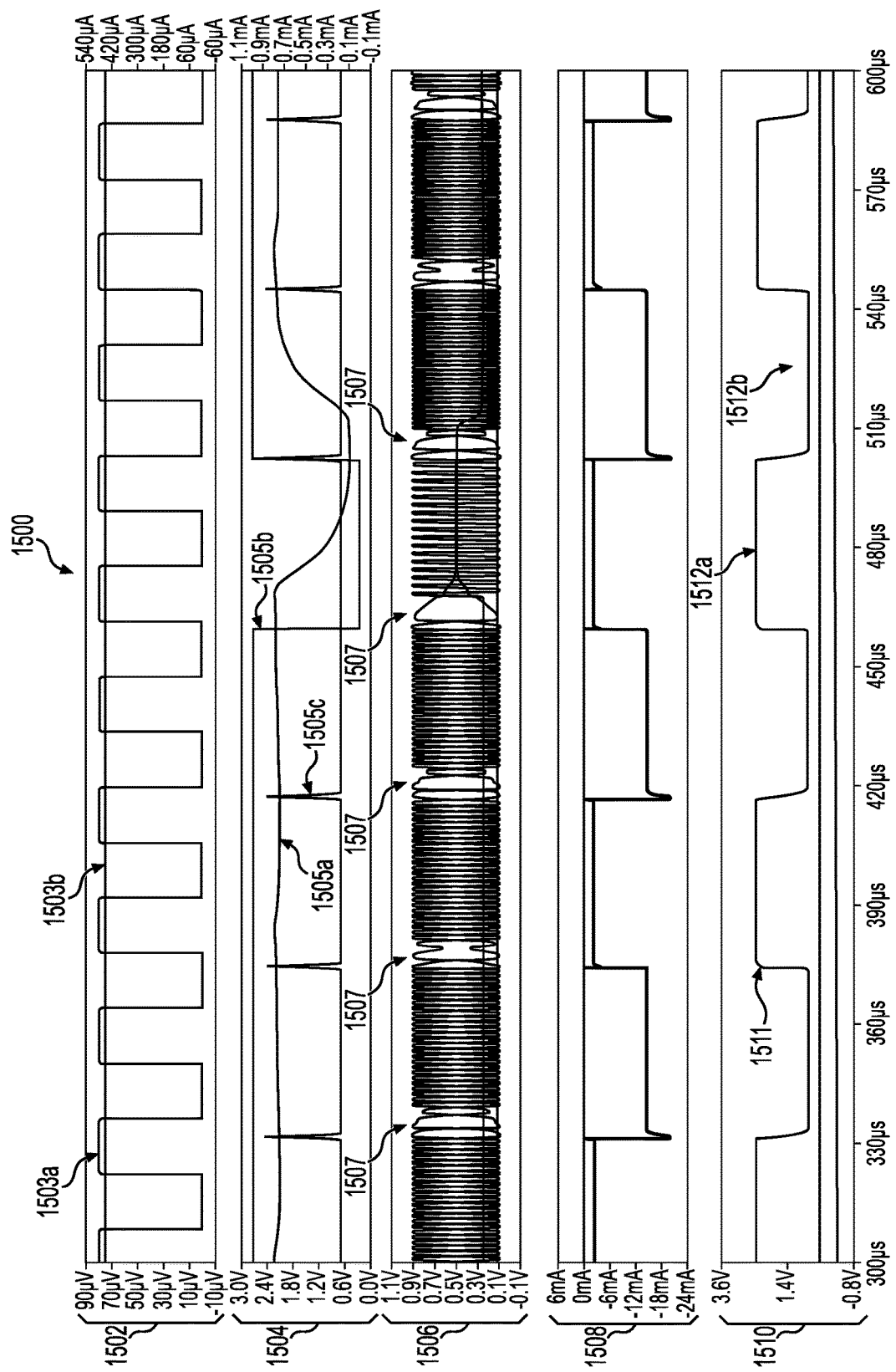

FIG. 15 shows additional simulation results fora system similar to the system 100 of FIG. 1A including optical detectors, each similar to the optical detector 400 shown in FIG. 4. Two circuit sections are simulated that are located on opposite sides of the screen. One section is designated as the "Left" side" and the other is designated as the "Right side". Approximately double expected extreme sun is simulated in FIG. 15. The results include the graphs 1502, 1504, 1506, 1208 and 1510.

The first graph 1502 shows first and second noise signals 1503a and 1503b. The first noise signal 1503a simulates 36 kHz TV controller noise injected in the system. The second noise signal 1503b simulates sun photodiode current added to the right section's photodiode currents at 450 micro amps (approximately two times the maximum sun expected).

The second graph 1504 shows simulated signals 1505a, 1505b and 1505c. Signal 1505a is simulated optical detector output (Rxout a0) that is sampled by the microcontroller's A/D converter. The microcontroller may be in the general form of the microcontroller 118 shown in FIG. 1A. Graph 1504 illustrates a voltage drop from a finger blocking the light path in signal 1505a. Specifically, signal 1505b is a simulated digital signal to indicate when the simulation has a clear optical path between the active light source and its corresponding detector when the signal 1505b is high (e.g. 1 mA), and conversely a blocked path when signal 1505b is low (e.g. 0 mA). Signal 1505c is a simulated signal showing the microcontroller's A/D sampling pulses (for sampling the signal 1505a) which maybe at a similar time to the step clock transition times when one optical detector ceases being driven and the next optical detector starts to be driven. The timing of microcontroller's sampling pulses in signal 1505c may be optimized to maximize the final signal to noise ratio.

The third graphs 1506 shows modulation pattern differential signals prior to sampling by the sample and hold circuit. Glitches 1507 may be caused by large signal level changes at transitions between optical detectors. Sampling pulses may be suppressed during the time range of these glitches 1507 to reduce the effects of these glitches on the microcontroller's sampled values. The duration and amplitude of these glitches may vary significantly, being affected by sun exposure, sensors and details of the circuitry. Likewise, the duration of suppressed sampling may be chosen to cover or substantially cover the glitch duration. These durations may be determined experimentally, observed, or estimated based on simulations for example.

The fourth graph 1508 shows drive current of the optical detector enable signals from the addressing circuitry (shift registers in this example). The maximum drive current in this example is 14.5 mA (which is less than the example 20 mA current maximum discussed above).

The fifth graph 1510 shows the ScreenOut voltage 1511. Output resulting from extreme sun (e.g. over period 1512a) and no sun (e.g. over period 1512b) is shown.

FIG. 16 shows additional simulation results fora system similar to the system 100 of FIG. 1A including optical detectors, each similar to the optical detector 400 shown in FIG. 4. Approximately double expected extreme sun is simulated in FIG. 16. The results include the graphs 1602, 1604, 1606, 1308 and 1610 (which show similar signals as FIG. 12).

The second graph 1604 illustrates shows simulated signals 1605a, 1605b and 1605c. Signal 1605a is simulated optical detector output (Rxout a0) that is sampled by the microcontroller's A/D converter. Graph 1604 illustrates a voltage drop from a finger blocking the light path in signal 1605a. Specifically, signal 1605b is a simulated digital signal to indicate when the simulation has a clear optical path between the active light source and its corresponding detector when the signal 1605b is high (e.g. 1 mA), and conversely a blocked path when signal 1605b is low (e.g. 0 mA). Signal 1605c is a simulated signal showing the microcontroller's A/D sampling pulses (for sampling the signal 1605a).

The third graphs 1606 shows modulation pattern differential signals prior to sampling by the sample and hold circuit. Glitches 1607 may be caused by large signal level changes at transitions between optical detectors. Sampling pulses may be suppressed during the time range of these glitches to reduce the effects of these glitches on the microcontroller's sampled values.

As illustrated by signal 1605*b*, the light path is blocked initially, then is unblocked for approximately one step clock period, then blocked for approximately the next two step clocks, and finally unblocked for the remaining step clock periods. As illustrated by signal 1605*a*, the simulated averaged output of sampled signals is almost steady through a "glitch period" 1607 shown in the third graph 1606, which is discussed below.

The fifth graph 1610 shows the ScreenOut voltage 1611. Output resulting from extreme sun (e.g. over period 1612*a*) and no sun (e.g. over period 1612*b*) is shown. During one period 1612*c*, all of the optical detectors are "off" (not active) in this simulation.

It is to be understood that a combination of more than one of the approaches described above may be implemented. Embodiments are not limited to any particular one or more of the approaches, methods or apparatuses disclosed herein. One skilled in the art will appreciate that variations, alterations of the embodiments described herein may be made in various implementations without departing from the scope of the claims.

The invention claimed is:

1. A touch sensor device comprising:
a sensing area having a periphery;
a plurality of light sources and a plurality of analog optical detectors arranged about the periphery of the sensing area, the plurality of light sources being aligned with the plurality of analog optical detectors;
a controller comprising:
addressing circuitry that selectively drives each of the plurality of light sources and selectively activates each of the plurality of analog optical detectors, wherein each light source, when driven, generates modulated light output having a modulation frequency; and
sampling circuitry operable to perform sampling of output from the plurality of analog optical detectors; and
sampling disable circuitry operable to disable sampling of the output from the plurality of analog optical detectors for a duration of time.

2. The touch sensor device of claim 1, wherein the sampling of output from the plurality of analog optical detectors is modulation edge-based sampling.

3. The touch sensor device of claim 1, wherein disabling the sampling for the duration of time is triggered by a transition from one of the plurality of analog optical detectors being activated to another of the plurality of analog optical detectors being activated.

4. The touch sensor device of claim 3, wherein the sample disable circuitry comprises a monostable module.

5. The touch sensor device of claim 4, wherein the addressing circuit sequentially activates analog optical detectors of the plurality of analog optical detectors as a function of a clock signal, and the monostable module is triggered the clock signal.

6. The touch sensor device of claim 5, wherein the monostable module generates a pulse output when triggered, the pulse output being input to edge sampling disable circuitry to disable the sampling for the duration of time.

7. The touch sensor device of claim 6, wherein the duration of time is a function of a pulse width of the pulse output of the monostable module.

8. A controller for a touch sensor device comprising a plurality of light sources and a plurality of analog optical detectors, comprising:
addressing circuitry that selectively drives each of the plurality of light sources and selectively activates each of the plurality of analog optical detectors, wherein each light source, when driven, generates modulated light output having a modulation frequency; and
sampling circuitry operable to perform modulation edge-based sampling of output from the plurality of analog optical detectors; and
sample disable circuitry operable to disable sampling of the output from the plurality of analog optical detectors for a duration of time.

9. The controller of claim 8, wherein the sampling of output from the plurality of analog optical detectors is modulation edge-based sampling.

10. The controller of claim 8, wherein the disabling the sampling for the duration of time is triggered by a transition from one of the plurality of analog optical detectors being activated to another of the plurality of analog optical detectors being activated.

11. The controller of claim 10, wherein the sample disable circuitry comprises a monostable module.

12. The controller of claim 11, wherein the addressing circuit sequentially activates analog optical detectors of the plurality of analog optical detectors as a function of a clock signal, and the monostable module is triggered by the clock signal.

13. The controller of claim 12, wherein the monostable module generates a pulse output when triggered, the pulse output being input to edge sampling disable circuitry to disable the sampling for the duration of time.

14. The controller of claim 13, wherein the duration of time is a function of a pulse width of the pulse output of the monostable module.

* * * * *